United States Patent
Uenodan et al.

(10) Patent No.: US 11,231,307 B2
(45) Date of Patent: Jan. 25, 2022

(54) PHYSICAL-QUANTITY DETECTION DEVICE

(71) Applicant: Hitachi Automotive Systems, Ltd., Hitachinaka (JP)

(72) Inventors: Akira Uenodan, Hitachinaka (JP); Takahiro Miki, Hitachinaka (JP); Tsutomu Kono, Hitachinaka (JP); Akihiro Yaguchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/052,313

(22) PCT Filed: Jun. 19, 2019

(86) PCT No.: PCT/JP2019/024211
§ 371 (c)(1),
(2) Date: Nov. 2, 2020

(87) PCT Pub. No.: WO2020/008875
PCT Pub. Date: Jan. 9, 2020

(65) Prior Publication Data
US 2021/0239500 A1 Aug. 5, 2021

(30) Foreign Application Priority Data
Jul. 6, 2018 (JP) .............................. JP2018-129128

(51) Int. Cl.
*G01F 1/684* (2006.01)
*G01F 1/688* (2006.01)
*G01F 15/18* (2006.01)

(52) U.S. Cl.
CPC ............ *G01F 1/6842* (2013.01); *G01F 1/688* (2013.01); *G01F 15/18* (2013.01)

(58) Field of Classification Search
CPC ......... G01F 15/18; G01F 1/6842; G01F 1/688
(Continued)

(56) References Cited

U.S. PATENT DOCUMENTS 5,880,372 A * 3/1999 Nasiri ................. G01L 19/0084
73/726
7,383,737 B1 * 6/2008 Lin ....................... G01L 9/0072
73/718

(Continued)

FOREIGN PATENT DOCUMENTS

JP 2009-528548 A 8/2009
JP 2009-300184 A 12/2009
(Continued)

OTHER PUBLICATIONS

International Search Report with English translation and Written Opinion issued in corresponding application No. PCT/JP2019/024211 dated Aug. 27, 2019.

*Primary Examiner* — Nathaniel T Woodward
(74) *Attorney, Agent, or Firm* — Foley & Lardner LLP

(57) ABSTRACT

To obtain a physical-quantity detection device that reduces a variation in mounting position in a main passage. A physical-quantity detection device 20 of the present invention is inserted into and disposed in a main passage 22, and includes a flange 211 fixed to a seat surface 103 of the main passage 22, and the flange 211 includes a press-fitting portion 281 for positioning with respect to a seat surface 103 side.

13 Claims, 25 Drawing Sheets

(58) Field of Classification Search
USPC .......................................................... 73/202.5
See application file for complete search history.

(56) References Cited

U.S. PATENT DOCUMENTS

| | | | | |
|---|---|---|---|---|
| 8,080,081 B2* | 12/2011 | Bruck | .................. | F01N 3/2853 |
| | | | | 55/523 |
| 9,441,584 B2* | 9/2016 | Tagawa | .................. | G01F 1/692 |
| 2007/0107511 A1 | 5/2007 | Strohrmann | | |
| 2009/0095069 A1* | 4/2009 | Lang | ....................... | G01F 15/18 |
| | | | | 73/204.22 |
| 2009/0308147 A1 | 12/2009 | Kozawa | | |
| 2015/0071593 A1 | 3/2015 | Kanke | | |
| 2015/0192441 A1 | 7/2015 | Tokuyasu | | |

FOREIGN PATENT DOCUMENTS

| JP | 2013-205582 A | 10/2013 |
|---|---|---|
| JP | 2014-01932 A | 1/2014 |
| JP | 2016-186499 A | 10/2016 |

\* cited by examiner

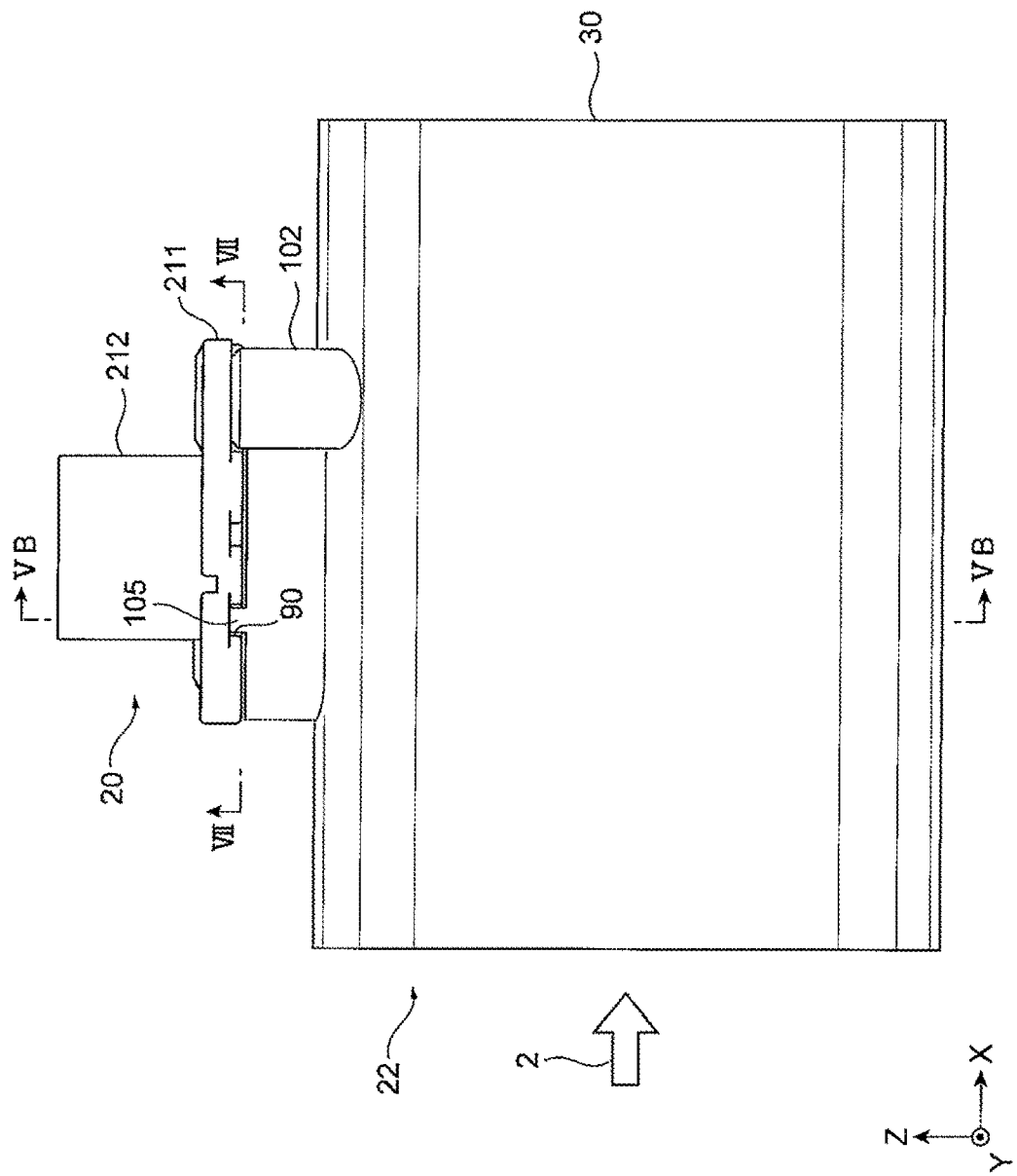

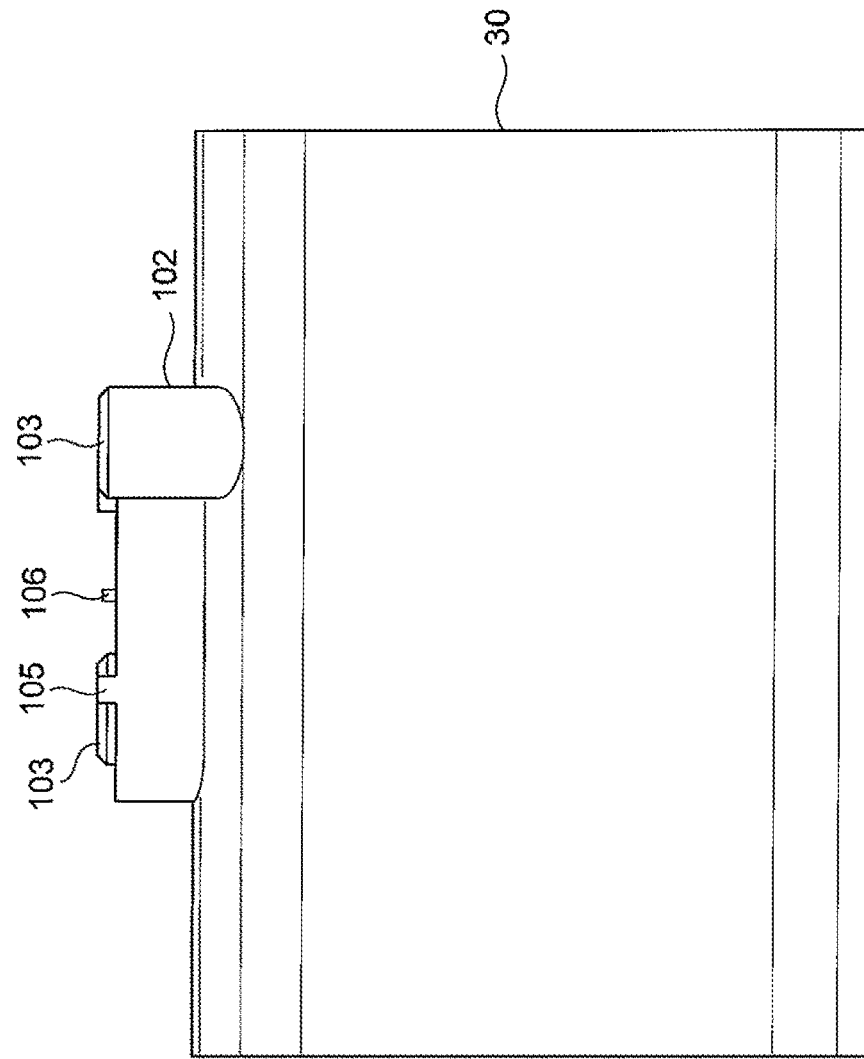

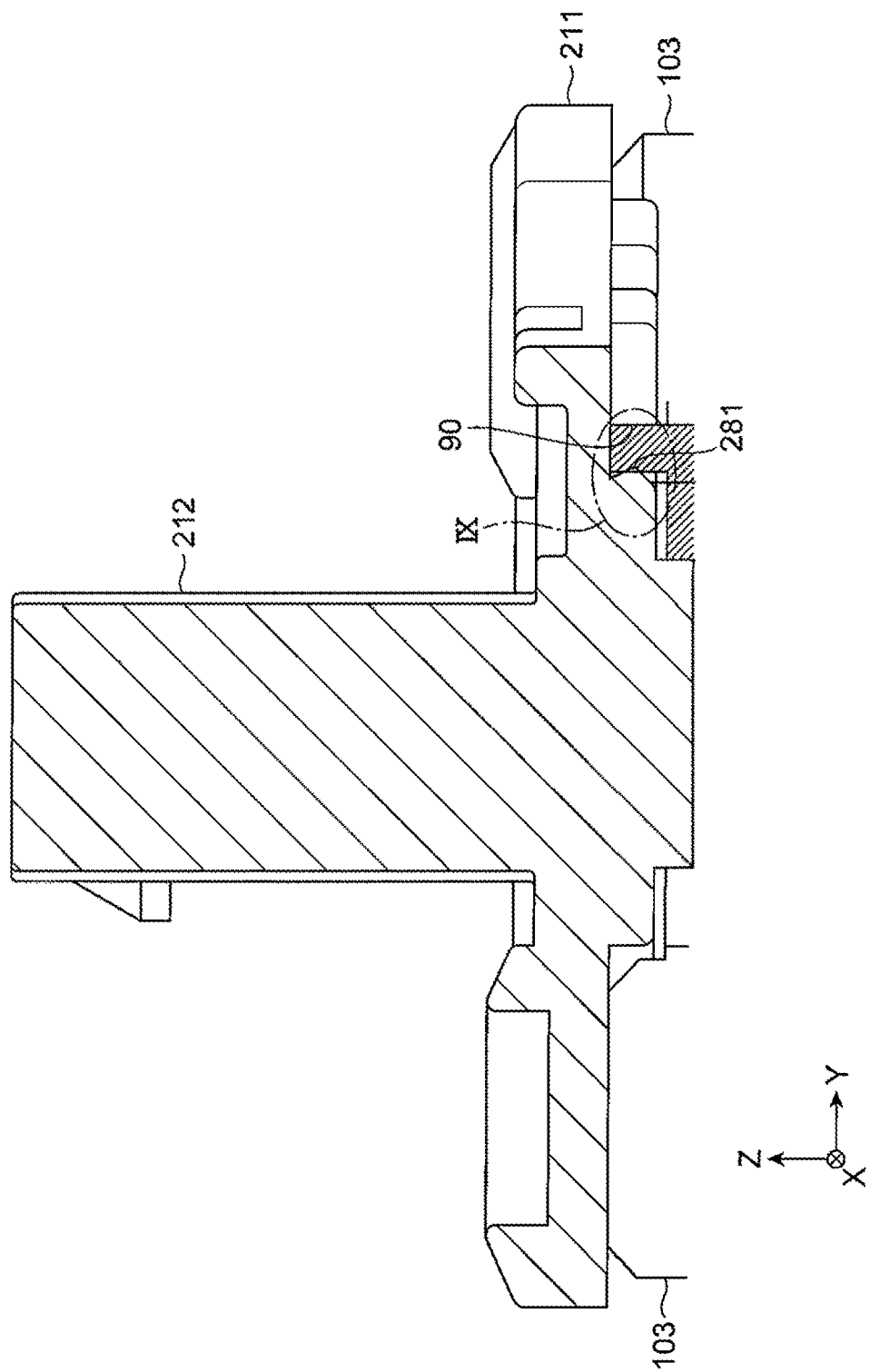

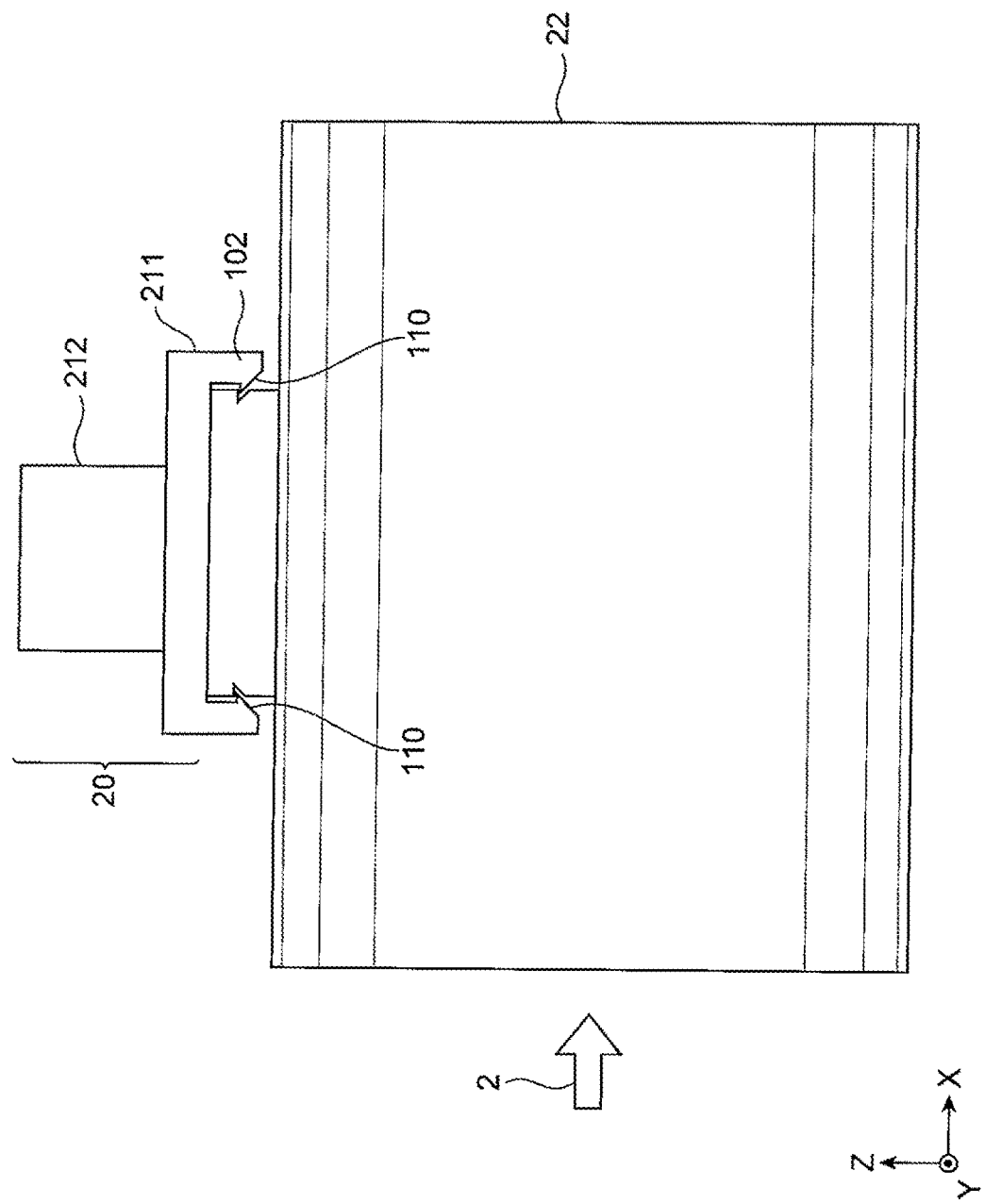

PHYSICAL-QUANTITY DETECTION DEVICE

TECHNICAL FIELD

The present invention relates to a physical-quantity detection device that detects, for example, a physical quantity of intake air of an internal combustion engine.

BACKGROUND ART

For example, PTL 1 illustrates a configuration of a physical-quantity detection device in which a measurement section protrudes from an inner wall of an intake passage toward the center of the passage to be screwed and fixed to a mounting seat surface of an intake pipe (main passage) via a flange of the physical-quantity detection device, an auxiliary passage that takes in a flow is disposed inside the measurement section, and a circuit substrate is disposed across the auxiliary passage which is bent.

Furthermore, in recent years, there has been proposed a physical-quantity detection device that has a configuration where the flow of an auxiliary passage branches into an outlet and the auxiliary passage, and separates pollutants, which have infiltrated into the auxiliary passage, to cause the pollutants to exit from the outlet to reduce the number of pollutants reaching a sensing section, and thus to improve pollution resistance of the sensor.

In addition, in a configuration illustrated in PTL 2, a protruding shape is provided on a mounting seat surface of an intake pipe (main passage), and a recessed shape that avoids interference with the protruding shape is provided on a flange of a physical-quantity detection device.

CITATION LIST

Patent Literature

PTL 1: JP 2016-186499 A
PTL 2: JP 2013-205582 A

SUMMARY OF INVENTION

Technical Problem

Since the above device described in PTL 1 has a configuration where a branch is formed in the auxiliary passage, the device is likely to be affected by a variation in mounting position where the device is mounted on the intake passage, and as a result, the flow rate of air passing through a detector is likely to be changed. Therefore, there is a risk that the detection accuracy of the sensor may deteriorate depending on the mounting position.

The present invention has been made in light of the above points, and an object of the present invention is to provide a physical-quantity detection device that can reduce a variation in mounting position of the physical-quantity detection device including an auxiliary passage to improve the flow rate detection accuracy.

Solution to Problem

According to the present invention, in order to solve the above problem, there is provided a physical-quantity detection device that is inserted into and disposed in a main passage, the device including: a flange fixed to a seat surface of the main passage; an auxiliary passage that takes in a part of gas to be measured flowing through the main passage; a flow rate detector that measures a flow rate of the gas to be measured flowing through the auxiliary passage; an electronic component that controls the flow rate detector; and a substrate on which the flow rate detector and the electronic component are mounted. The flange includes a press-fitting portion for positioning with respect to a seat surface side of the main passage.

Advantageous Effects of Invention

According to the present invention, since the physical-quantity detection device is fixed to the seat surface of the main passage in a certain direction, a variation in mounting position is suppressed, so that the flow rate detection accuracy can be improved.

Further features relating to the present invention will become apparent from the description of the specification and the accompanying drawings. In addition, problems, configurations, and effects other than those described above will become apparent from the description of the following embodiments.

BRIEF DESCRIPTION OF DRAWINGS

FIG. 5A is a front view of the physical-quantity detection unit.

FIG. 6A is a front view of a main passage.

FIG. 8 is a cross-sectional view along line VIII-VIII of FIG. 7.

FIG. 12 is a view describing another embodiment corresponding to FIG. 5A.

DESCRIPTION OF EMBODIMENTS

Figure 1:
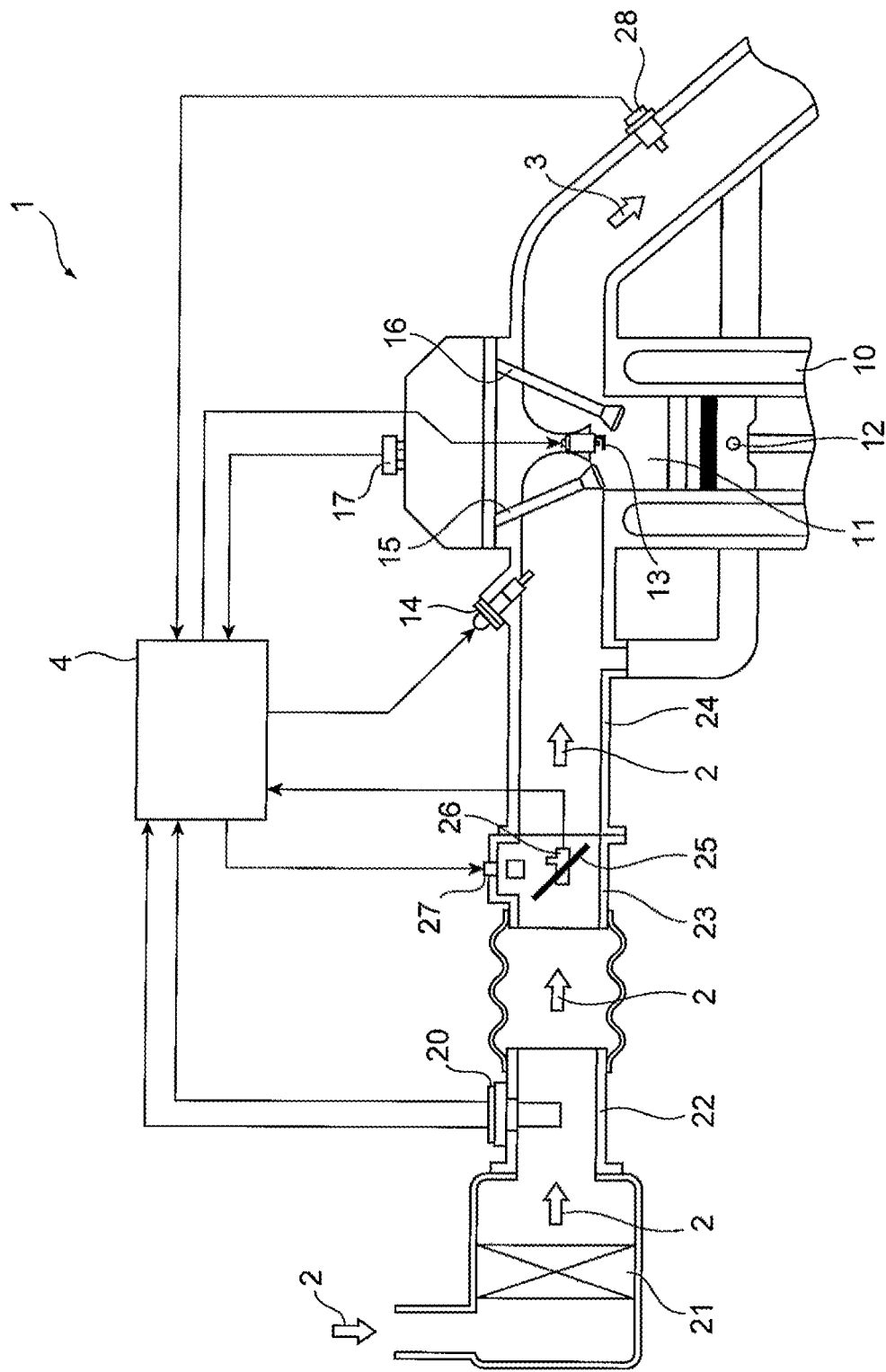
FIG. 1 is a system diagram illustrating one embodiment in which a physical-quantity detection device according to the present invention is used in an internal combustion engine control system.

Modes for carrying out the invention (hereinafter, embodiments) to be described below solve various problems which are requested to be solved in an actual product, particularly, solve various problems which are desirable to be solved for use as a detection device that detects a physical quantity of intake air of a vehicle, and exhibit various effects. One of the various problems solved by the following embodiments is the content described in the section of technical problem described above, and one of the various effects exhibited by the following embodiments is the effect described in the section of advantageous effects of invention. The various problems solved by the following embodiments and the various effects exhibited by the following embodiments will be described in the following embodiments. Therefore, the problems and the effects solved by the embodiments, which will be described in the following embodiments will also describe contents other than the contents of the section of technical problem and the section of advantageous effects of invention.

In the following embodiments, the same configurations are denoted by the same reference signs even when illustrated in the drawings with different numbers, and have the same effects. Regarding configurations that have been already described, only reference signs may be added to the drawings and descriptions may be omitted.

FIG. 1 is a system diagram illustrating one embodiment in which a physical-quantity detection device according to the present invention is used in an electronic fuel injection internal combustion engine control system 1. According to an operation of an internal combustion engine 10 including an engine cylinder 11 and an engine piston 12, intake air is taken in as gas 2 to be measured from an air cleaner 21 to be guided to a combustion chamber of the engine cylinder 11 via, for example, an intake body that is a main passage 22, a throttle body 23, and an intake manifold 24. A physical quantity of the gas 2 to be measured that is intake air to be guided to the combustion chamber is detected by a physical-quantity detection device 20 according to the present invention, and based on the detected physical quantity, fuel is supplied from a fuel injection valve 14 to be guided to the combustion chamber, together with the gas 2 to be measured in an air-fuel mixture state. Incidentally, in the present embodiment, the fuel injection valve 14 is provided in an intake port of the internal combustion engine, and the fuel injected into the intake port forms an air-fuel mixture, together with the gas 2 to be measured, and the air-fuel mixture is guided into the combustion chamber via an intake valve 15 to be combusted to generate mechanical energy.

The fuel and the air guided to the combustion chamber form a mixed state of fuel and air and are explosively combusted by spark ignition of a spark plug 13 to generate mechanical energy. The gas after the combustion is guided from an exhaust valve 16 to an exhaust pipe to be exhausted from the exhaust pipe as exhaust gas 3. The flow rate of the gas 2 to be measured that is the intake air to be guided to the combustion chamber is controlled by a throttle valve 25 of which the opening degree is changed according to an operation of an accelerator pedal. The fuel supply quantity is controlled based on the flow rate of the intake air to be guided to the combustion chamber, and a driver controls the opening degree of the throttle valve 25 to control the flow rate of the intake air to be guided to the combustion chamber, so that mechanical energy generated by the internal combustion engine can be controlled.

<Overview of Control of Internal Combustion Engine Control System>

The physical quantities such as the flow rate, temperature, humidity, and pressure of the gas 2 to be measured that is the intake air which is taken in from the air cleaner 21 to flow through the main passage 22 are detected by the physical-quantity detection device 20, and electrical signals indicating the physical quantities of the intake air are input to a control device 4 from the physical-quantity detection device 20. In addition, an output of a throttle angle sensor 26 that measures the opening degree of the throttle valve 25 is input to the control device 4, and an output of a rotation angle sensor 17 that measures the positions or states of the engine piston 12, the intake valve 15, or the exhaust valve 16 of the internal combustion engine and the rotational speed of the internal combustion engine is input to the control device 4. An output of an oxygen sensor 28 that measures the state of a mixture ratio of a fuel quantity and an air quantity from the state of the exhaust gas 3 is input to the control device 4.

The control device 4 calculates a fuel injection quantity or an ignition timing based on the physical quantities of the intake air, which are outputs of the physical-quantity detection device 20, and the rotational speed of the internal combustion engine, which is measured based on an output of the rotation angle sensor 17. The quantity of fuel supplied from the fuel injection valve 14 and the ignition timing when an ignition is initiated by the spark plug 13 are controlled based on a result of the calculation. The fuel supply quantity or the ignition timing is finely controlled actually further based on temperature detected by the physical-quantity detection device 20, the change state of the throttle angle, the change state of the rotational speed of the engine, and the state of the air fuel ratio measured by the oxygen sensor 28. When the internal combustion engine is in an idling state, the control device 4 causes an idle air control valve 27 to control the quantity of air which bypasses the throttle valve 25, to control the rotational speed of the internal combustion engine in an idling state.

Both of the fuel supply quantity and the ignition timing that are main control quantities of the internal combustion engine are calculated using the outputs of the physical-quantity detection device 20 as main parameters. Therefore, an improvement in detection accuracy, suppression of a change over time, an improvement in reliability of the physical-quantity detection device 20 are important in improving the control accuracy or securing the reliability of a vehicle.

Particularly, in recent years, there have been a very high demand for a reduction in fuel consumption of vehicles and a very high demand for exhaust gas purification. An improvement in accuracy of detecting the physical quantities of intake air which are detected by the physical-quantity detection device 20 is extremely important in meeting the demands. In addition, it is also important that the physical-quantity detection device 20 maintains high reliability.

A vehicle in which the physical-quantity detection device 20 is installed is used in an environment where a change in temperature or humidity is large. It is desirable that the physical-quantity detection device 20 take into consideration a measure against a change in temperature or humidity in the usage environment or a measure against dust, pollutants, or the like.

In addition, the physical-quantity detection device 20 is mounted on an intake pipe affected by heat generated from the internal combustion engine. For this reason, the generated heat of the internal combustion engine is transmitted to the physical-quantity detection device 20 via the intake pipe. Since the physical-quantity detection device 20 transmits heat to the gas to be measured to detect the flow rate of the gas to be measured, it is important that the influence of heat from outside is suppressed as much as possible.

The physical-quantity detection device 20 installed in the vehicle not only, as will be described below, simply solves the problems described in the section of technical problem and exhibits the effects described in the section of advantageous effects of invention, but also, as will be described below, takes the above-descried various problems into consideration to solve various problems of a product and exhibits various effects. Specific problems to be solved or specific effects to be exhibited by the physical-quantity detection device 20 will be described in the following embodiment.

<Exterior Structure of Physical-Quantity Detection Device>

FIGS. 2A to 2G are views illustrating an exterior of the physical-quantity detection device. Incidentally, in the following description, the gas to be measured flows along a central axis of the main passage 22.

The physical-quantity detection device 20 includes a housing 201 and a cover 202 mounted on the housing 201. The housing 201 is formed by injection molding a synthetic resin material, and the cover 202 is formed of a plate-shaped member made of an electrically conductive material such as an aluminum alloy. The cover 202 is formed in a thin plate shape, and has a wide flat cooling surface.

The housing 201 includes a flange 211 for fixing the physical-quantity detection device 20 to the main passage 22, a connector 212 that protrudes from the flange 211 and is exposed outside from the intake body to be electrically connected with an external device, and a measurement section 213 that extends so as to protrude from the flange 211 toward the center of the main passage 22.

The measurement section 213 has a thin and long shape extending from the flange 211 toward the center of the main passage 22, and has a front surface 221 and a back surface 222 having a wide width and a pair of side surfaces 223 and 224 having a narrow width. The measurement section 213 protrudes from an inner wall of the main passage 22 toward the passage center of the main passage 22 in a state where the physical-quantity detection device 20 is mounted on the main passage 22. Then, the front surface 221 and the back surface 222 are disposed parallel to each other along the central axis of the main passage 22, and of the side surfaces 223 and 224 having a narrow width of the measurement section 213, the side surface 223 on one side in a lateral direction of the measurement section 213 is disposed to face an upstream side of the main passage 22 and the side surface 224 on the other side in the lateral direction of the measurement section 213 is disposed to face a downstream side of the main passage 22.

Figure 2A:
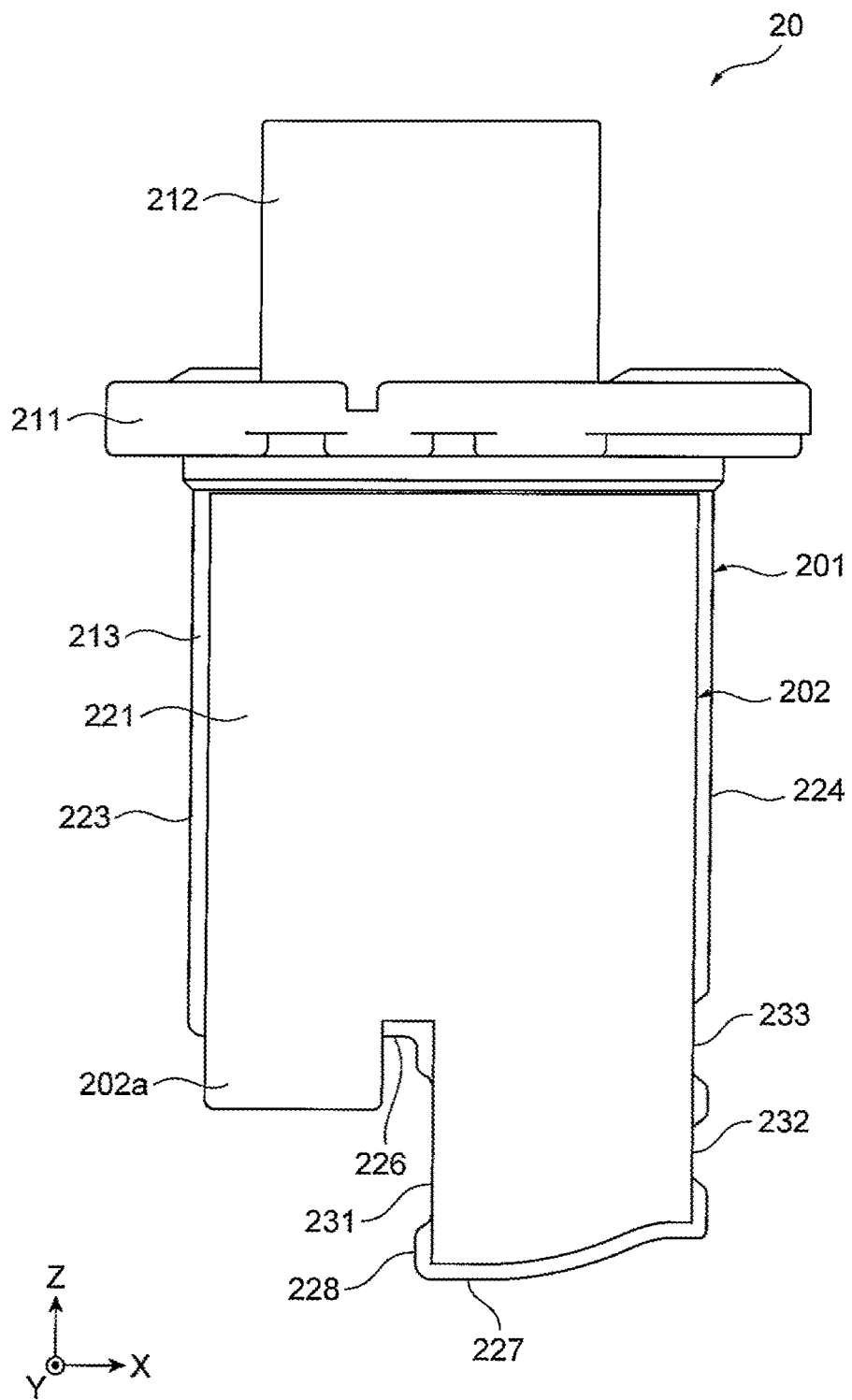
FIG. 2A is a front view of the physical-quantity detection device.
Figure 2B:
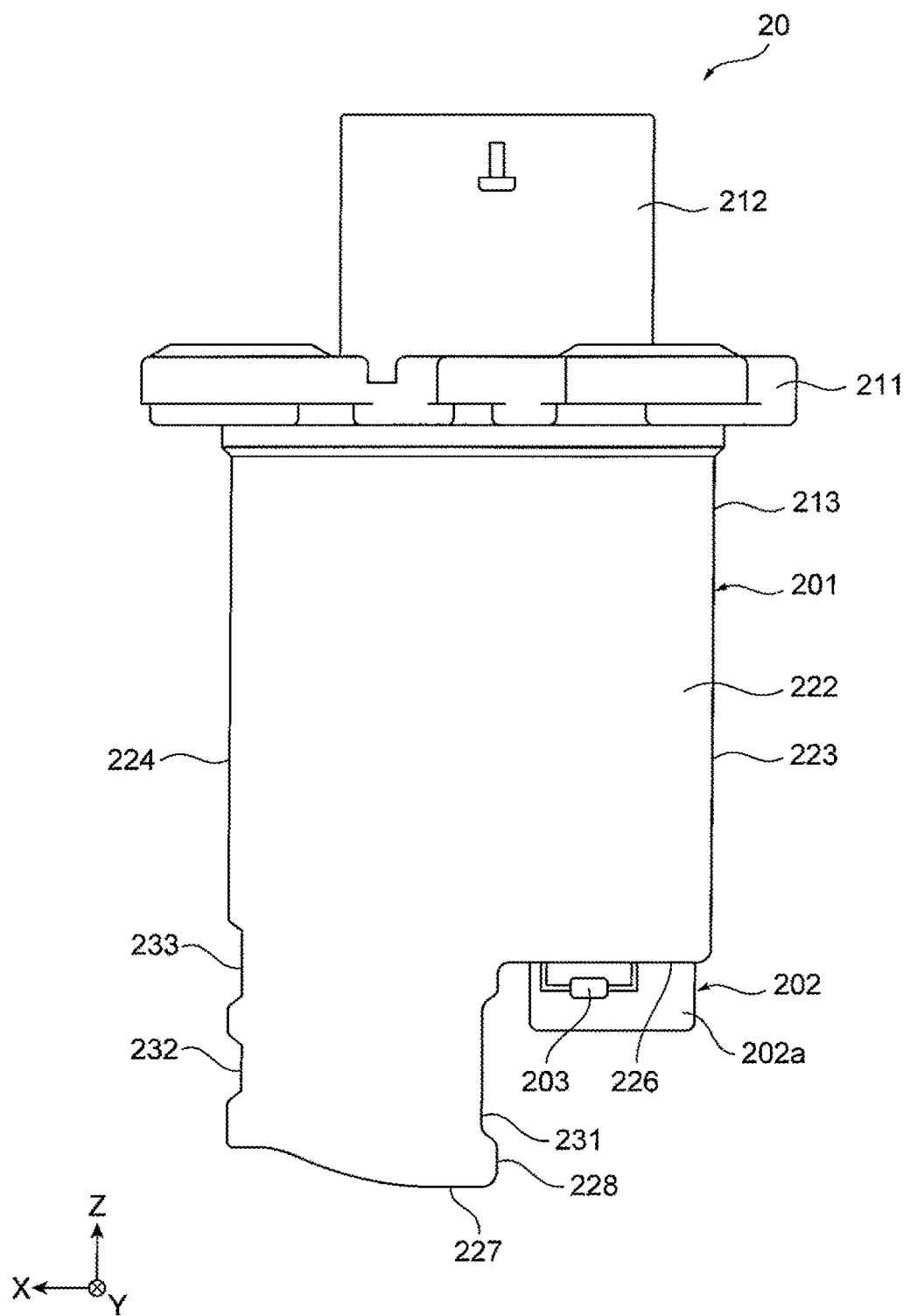
FIG. 2B is a back view of the physical-quantity detection device.
Figure 2C:
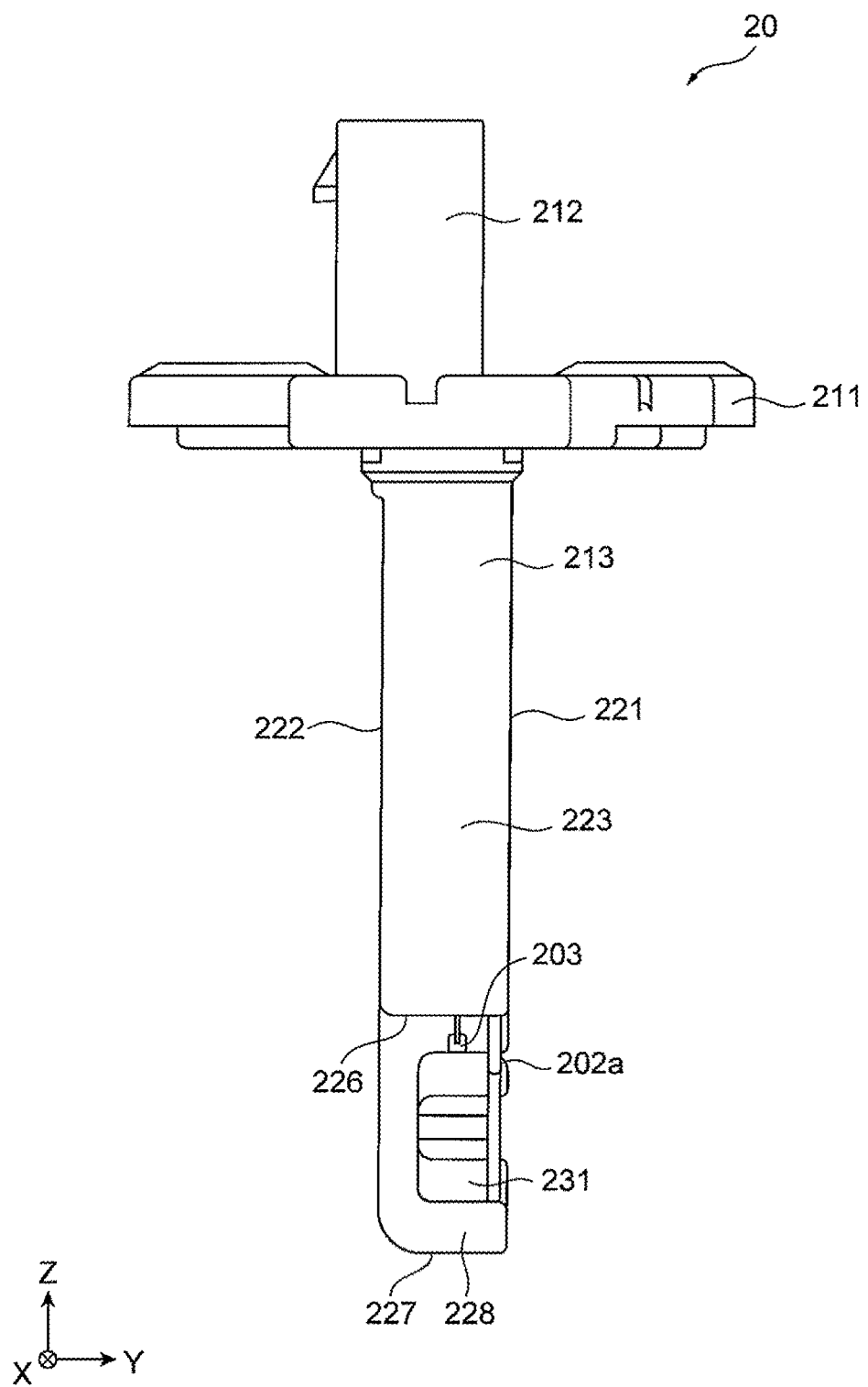
FIG. 2C is a left side view of the physical-quantity detection device.
Figure 2D:
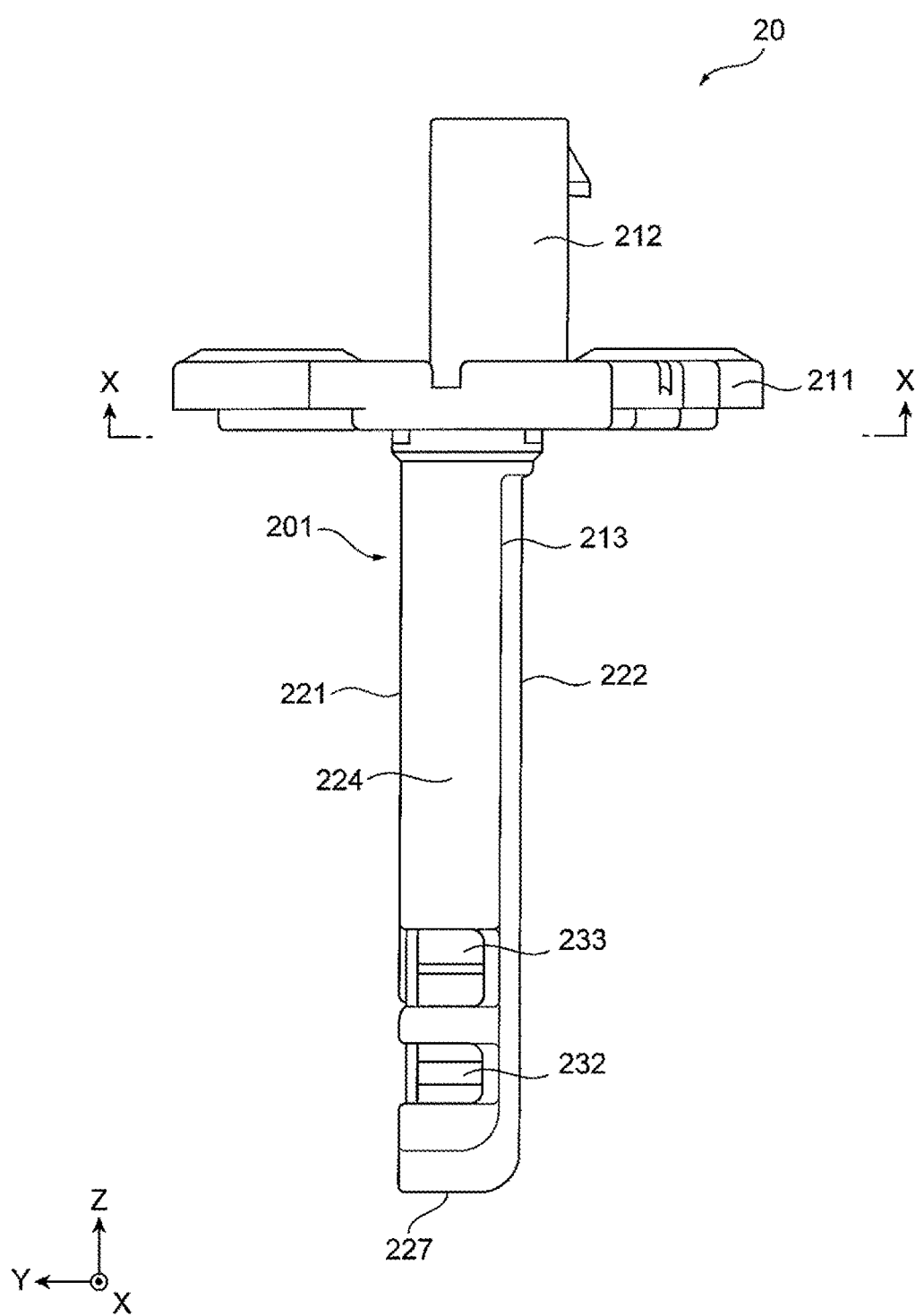
FIG. 2D is a right side view of the physical-quantity detection device.
Figure 2E:
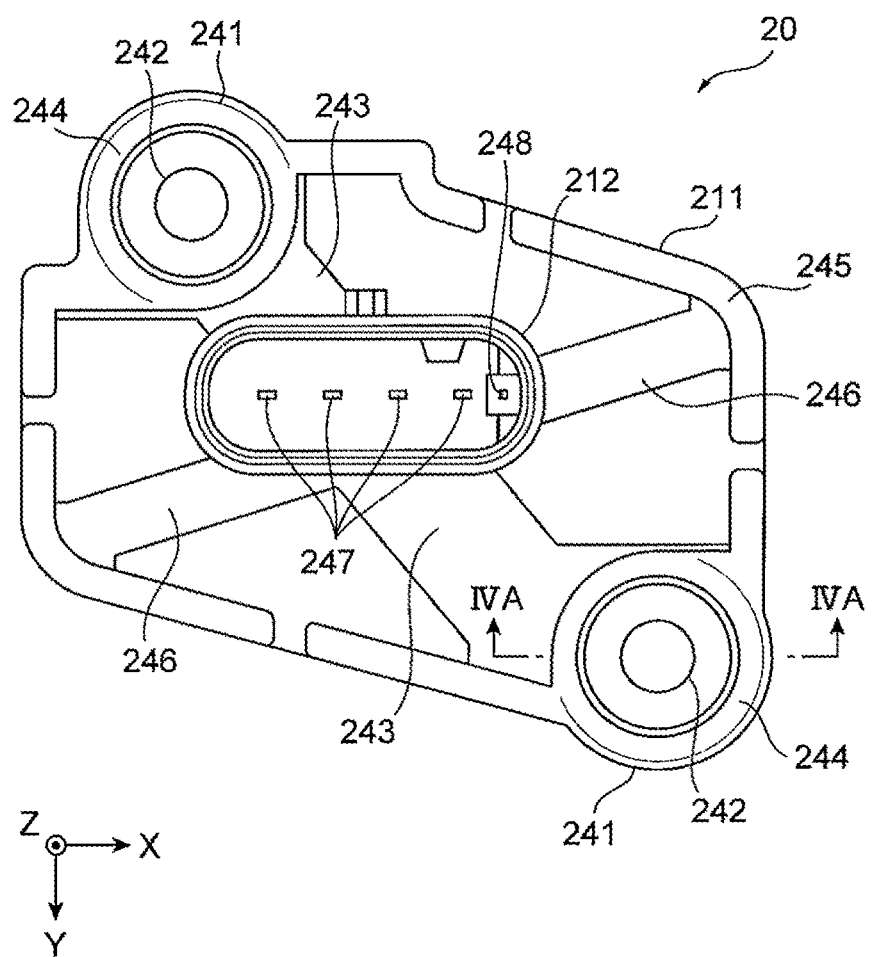
FIG. 2E is a plan view of the physical-quantity detection device.
Figure 2F:
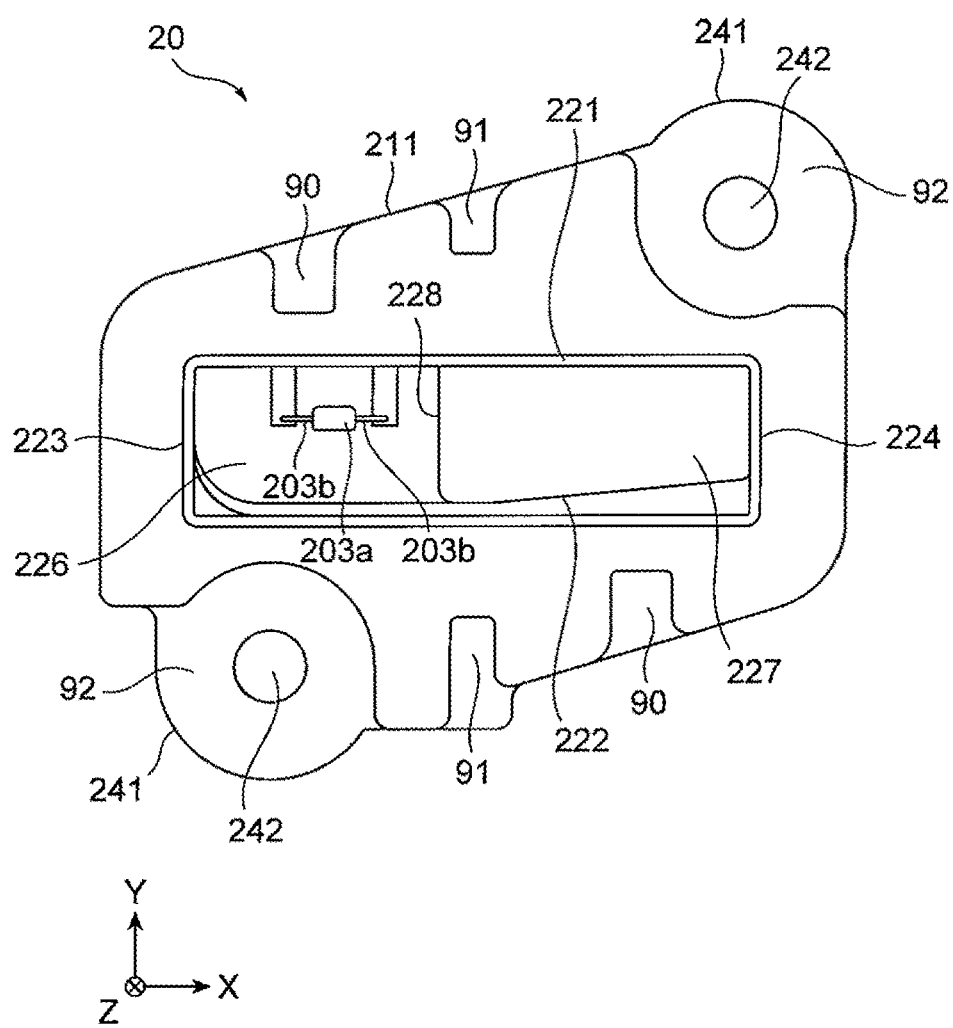
FIG. 2F is a bottom view of the physical-quantity detection device.

In the measurement section 213, as illustrated in FIG. 2F, the front surface 221 of the measurement section 213 is flat from the side surface 223 on the one side to the side surface 224 on the other side along the lateral direction, whereas the back surface 222 of the measurement section 213 has chamfered corners and has a so-called streamlined cross-sectional shape in which the back surface 222 is inclined in a direction to gradually approach the front surface 221 as the back surface 222 approaches the side surface 224 on the other side from an intermediate position in the lateral direction. Therefore, the gas 2 to be measured that has flown from upstream of the main passage 22 can be smoothly guided downstream along the front surface 221 and the back surface 222, and fluid resistance against the gas 2 to be measured can be reduced.

In a distal end portion of the measurement section 213, as illustrated in FIGS. 2A and 2B, a lower surface of the measurement section 213 is formed in a step shape and has a lower surface 226 on the one side which is disposed on the upstream side of the main passage 22 in a state where the physical-quantity detection device 20 is mounted on the main passage 22, and a lower surface 227 on the other side which is disposed on the downstream side of the main passage 22, the lower surface 227 on the other side protrudes further than the lower surface 226 on the one side, and a step surface 228 that connects the lower surface 226 on the one side and the lower surface 227 on the other side is disposed to face the upstream side of the main passage 22. Then, an inlet 231 that takes a part of the gas 2 to be measured such as intake air into an auxiliary passage in the measurement section 213 is open in the step surface 228 of the measurement section 213. Then, a first outlet 232 and a second outlet 233 from which the gas 2 to be measured which has been taken into the auxiliary passage in the measurement section 213 returns to the main passage 22 are open in the side surface 224 on the other side in the lateral direction of the measurement section 213 at a position opposite the step surface 228.

Namely, the measurement section 213 includes a first wall portion (side surface 223 on the one side) which is disposed to face an upstream side in a flow direction of the gas 2 to be measured in the main passage 22, and a second wall portion (step surface 228) which is disposed closer to a distal end portion side of the measurement section 213 than the first wall portion at a downstream position in the flow direction of the gas 2 to be measured in the main passage 22, to face the upstream side in the flow direction of the gas 2 to be measured and in which the inlet 231 of the auxiliary passage is open.

Since the inlet 231 of the auxiliary passage is provided in the distal end portion of the measurement section 213 extending from the flange 211 toward the direction of the center of the main passage 22, the physical-quantity detection device 20 can take in gas that is not in the vicinity of an inner wall surface of the main passage 22 but is in a portion which is separated from the inner wall surface and is close to the center. For this reason, the physical-quantity detection device 20 can measure the flow rate of the gas in the portion separated from the inner wall surface of the main passage 22, and can suppress a decrease in measurement accuracy, which is due to heat or the like.

The gas 2 to be measured in the vicinity of the inner wall surface of the main passage 22 is likely to be affected by the temperature of the main passage 22, so that the temperature of the gas 2 to be measured differs from the original temperature of the gas and differs from an average state of main gas in the main passage 22. Particularly, when the main passage 22 is an intake body of the engine, in many cases, the main passage 22 is affected by heat from the engine, and thus is maintained at high temperature. For this reason, in many cases, the temperature of the gas in the vicinity of the inner wall surface of the main passage 22 is higher than the original gas temperature in the main passage 22, and becomes a factor causing a decrease in measurement accuracy. In addition, in the vicinity of the inner wall surface of the main passage 22, the fluid resistance is large, and the flow speed is lower than an average flow speed of the main passage 22. For this reason, when the gas in the vicinity of the inner wall surface of the main passage 22 is taken into the auxiliary passage as the gas 2 to be measured, there is a risk that a decrease in flow speed with respect to the average flow speed of the main passage 22 may lead to a measurement error.

Since the inlet 231 is provided in the distal end portion of the measurement section 213 that is thin and long and extends from the flange 211 toward the center of the main passage 22, the physical-quantity detection device 20 can reduce a measurement error related to a decrease in flow speed in the vicinity of the inner wall surface. In addition, since the inlet 231 is provided in the distal end portion of the measurement section 213 extending from the flange 211 toward the center of the main passage 22; and besides the first outlet 232 and the second outlet 233 of the auxiliary passage are provided in the distal end portion of the measurement section 213, the physical-quantity detection device 20 can further reduce the measurement error.

In the physical-quantity detection device 20, the measurement section 213 has a shape that extends long along an axis from the inner wall toward the center of the main passage 22, but as illustrated in FIGS. 2C and 2D, the width of the side surfaces 223 and 224 have a narrow shape. Accordingly, the physical-quantity detection device 20 can suppress the fluid resistance against the gas 2 to be measured to a small value.

<Structure of Temperature Detector>

In the physical-quantity detection device 20, as illustrated in FIG. 2B, the distal end portion of the measurement section 213 is provided with an intake air temperature sensor 203 that is a temperature detector. The intake air temperature sensor 203 is exposed outside the measurement section 213. The intake air temperature sensor 203 is provided at a position between the side surface 223 and the step surface 228 of the measurement section 213, and is disposed at a position downstream of the side surface 223 on the one side of the measurement section 213 and at a position upstream of the step surface 228 of the measurement section 213 in the flow direction of the gas 2 to be measured. The inlet 231 of the auxiliary passage is open in the step surface 228 of the measurement section 213, and the intake air temperature sensor 203 is disposed upstream of the inlet 231 of the auxiliary passage in the flow direction of the gas to be measured.

Since the intake air temperature sensor 203 is exposed outside the measurement section 213 and is disposed upstream of the inlet 231 of the auxiliary passage, there is no risk that the intake air temperature sensor 203 further affects the flow rate measurement of a flow sensor 205 provided in the auxiliary passage, compared to a case where the intake air temperature sensor 203 is disposed in the auxiliary passage of the measurement section 213.

As illustrated in FIG. 2F, the intake air temperature sensor 203 includes a sensor main body 203a having a columnar shape, and an axial lead component including a pair of leads 203b that protrude from both end portions in an axial direction of the sensor main body 203a in directions to separate from each other. The intake air temperature sensor 203 is mounted on a circuit substrate 207 inside the measurement section 213 via the leads 203b, the pair of leads 203b protrude from the lower surface 226 on the one side of the measurement section 213, and the sensor main body 203a is disposed at a position facing the step surface 228 of the measurement section 213. The intake air temperature sensor 203 is disposed so as to be parallel to the lower surface 226 on the one side of the measurement section 213 and to be oriented along the flow direction of the gas 2 to be measured.

Since the intake air temperature sensor 203 is exposed outside the measurement section 213 in a state where the sensor main body 203a is supported by the pair of leads 203b, the measurement section 213 is provided with a protector 202a that protects the intake air temperature sensor 203. The protector 202a protrudes from the lower surface 226 on the one side of the measurement section 213 and is disposed closer to a front side of the measurement section 213 than the intake air temperature sensor 203, to face the intake air temperature sensor 203. In the present embodiment, the protector 202a is formed by causing a part of the cover 202 to protrude further than the lower surface 226 of the measurement section 213. Since the intake air temperature sensor 203 is exposed outside the measurement section 213, there is a risk that in this state, for example, during transport of the physical-quantity detection device 20 or during operation of mounting the physical-quantity detection device 20 on the main passage 22, the intake air temperature sensor 203 may come into contact with other objects and thus the detection performance of the intake air temperature sensor 203 is affected. In the physical-quantity detection device 20, the protector 202a is disposed on the front side of the measurement section 213 to face the intake air temperature sensor 203, and thus during transport or operation or the like, the intake air temperature sensor 203 can be beforehand prevented from coming into direct contact with other objects.

The protrusion length of the protector 202a can be randomly selected. For example, when the intake air temperature sensor 203 is disposed at a position far separated from the lower surface 226 on the one side of the measurement section 213, the protrusion length of the protector 202a is set such that a distal end of the protector 202a is disposed at least at the same position as that of the intake air temperature sensor 203. In addition, when the intake air temperature sensor 203 is disposed at a position in the vicinity of the lower surface 226 on the one side of the measurement section 213, a possibility of contact between the intake air temperature sensor 203 and other objects is further reduced compared to a case where the intake air temperature sensor 203 is disposed at a position far separated from the lower surface 226, the protector may not be provided.

According to the physical-quantity detection device 20 of the present embodiment, since the intake air temperature sensor 203 is not disposed at a position upstream of the side surface 223 on the one side of the measurement section 213 but disposed at a position downstream of the side surface 223 on the one side of the measurement section 213 and upstream of the step surface 228 of the measurement section 213, the gas 2 to be measured flowing straight from the upstream side and in addition thereto, a separation flow can also be applied to the intake air temperature sensor 203. Therefore, heat dissipation of the intake air temperature sensor 203 can be improved.

<Structure of Flange>

In the physical-quantity detection device 20, the measurement section 213 is inserted into a cylindrical body 30 from a mounting hole 31 provided in the main passage 22, and the flange 211 comes into contact with a seat surface 103 to be fixed to a mounting pedestal 102 of the main passage 22 with screws (refer to FIG. 4). The flange 211 has a substantially rectangular shape having a predetermined thickness in a plan view, and as illustrated in FIGS. 2E and 2F, a pair of fixing portions 241 are provided at corners on a diagonal line. The fixing portion 241 has a through-hole 242 penetrating through the flange 211. Fixing screws (unillustrated) are inserted into the through-holes 242 of the fixing portions 241 to be screwed into screw holes 104 of the main passage 22, so that the flange 211 is fixed to the mounting pedestal 102 of the main passage 22. In addition, the flange 211 includes a recessed groove 90, a recessed groove 91, and a recessed groove 92 that have a recessed shape. Embodiments thereof will be described in later.

As illustrated in FIG. 2E, a plurality of ribs are provided on an upper surface of the flange 211. The ribs include a first rib 243 that linearly connects the fixing portion 241 and the connector 212, a second rib 244 that has a tapered cross section and surrounds the through-hole 242 of the fixing portion 241, a third rib 245 that is provided along an outer peripheral portion of the flange 211, and a fourth rib 246 that extends on a diagonal line of the flange 211 in a direction intersecting the first rib 243.

Since the first rib 243 is linearly provided between the fixing portion 241 to which screw fixing force toward the main passage 22 is applied and the connector 212 having relatively high rigidity due to having a three-dimensional shape, a flange reinforcement effect of reinforcing the rigidity of the flange is high. Therefore, compared to a case where the first rib 243 is not provided, the thickness of the flange 211 can be further thinned, the weight of the entire housing can be further reduced, and during molding of the housing 201, the influence of contraction of the resin forming the flange 211 can be further reduced.

Figure 2G:
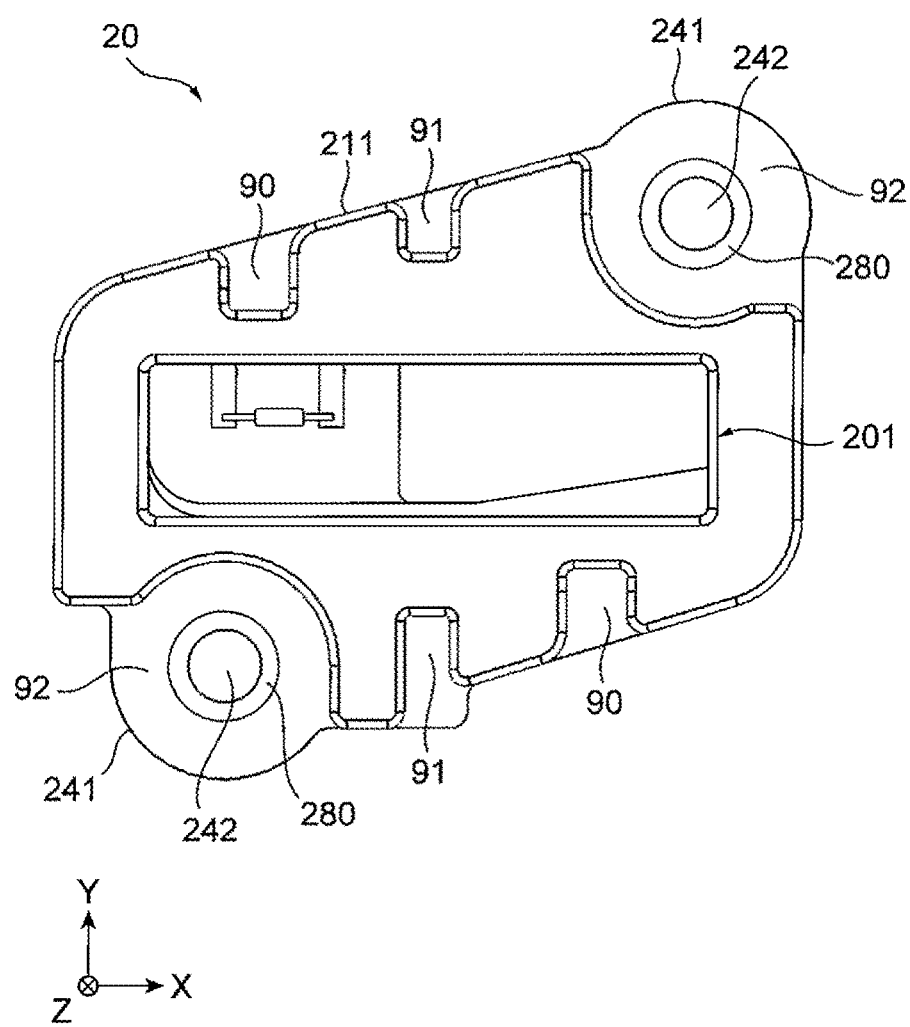
FIG. 2G is a view describing another embodiment of FIG. 2F.

FIG. 2G is a view describing another embodiment of FIG. 2F, and illustrates one example where a bush 280 made of metal is installed in the through-hole 242. As described above, the fixing screws are inserted into the through-holes 242 of the flange 211 to be screwed into the screw holes 104 of the mounting pedestal 102 of the main passage 22, so that the physical-quantity detection device 20 is fixed. However, since the flange 211 is made of a resin material, during screwing, a creep phenomenon may occur to cause the loosening of the screws. For this reason, the bushes 280 are installed and screwing is performed, and thus the loosening of the screws can be reduced. Incidentally, the screws may be bolt screws or tapping screws.

<Fixing Structure of Flange>

Figure 4A:
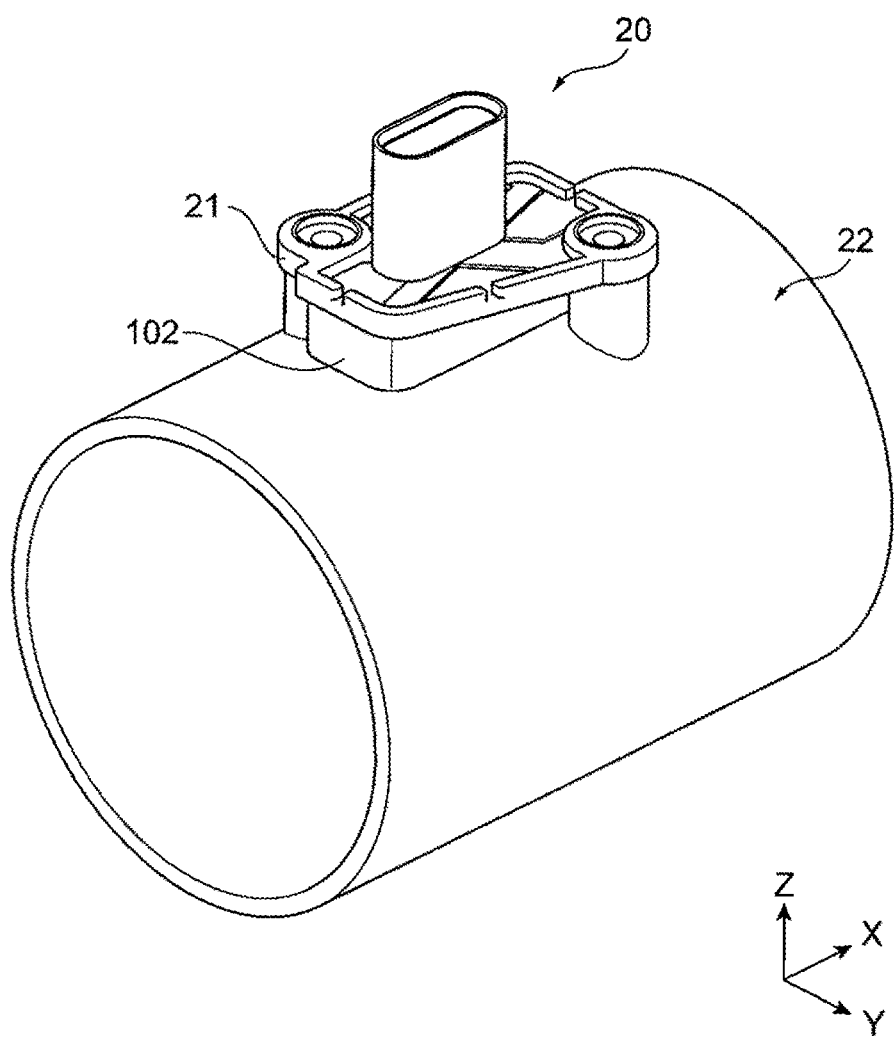
FIG. 4A is an entire perspective view of a physical-quantity detection unit.
Figure 4B:
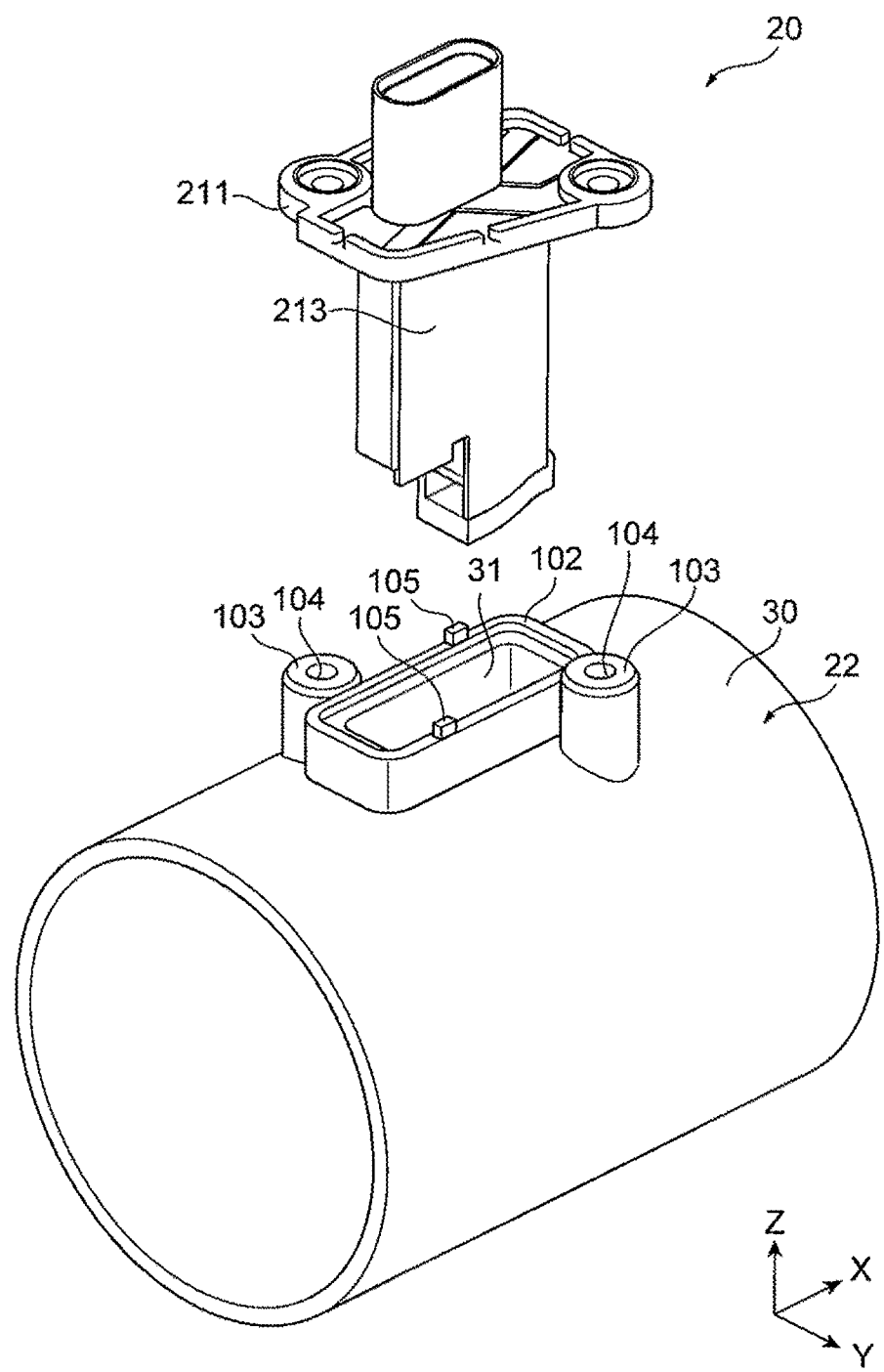
FIG. 4B is an exploded perspective view of the physical-quantity detection unit.
Figure 5B:
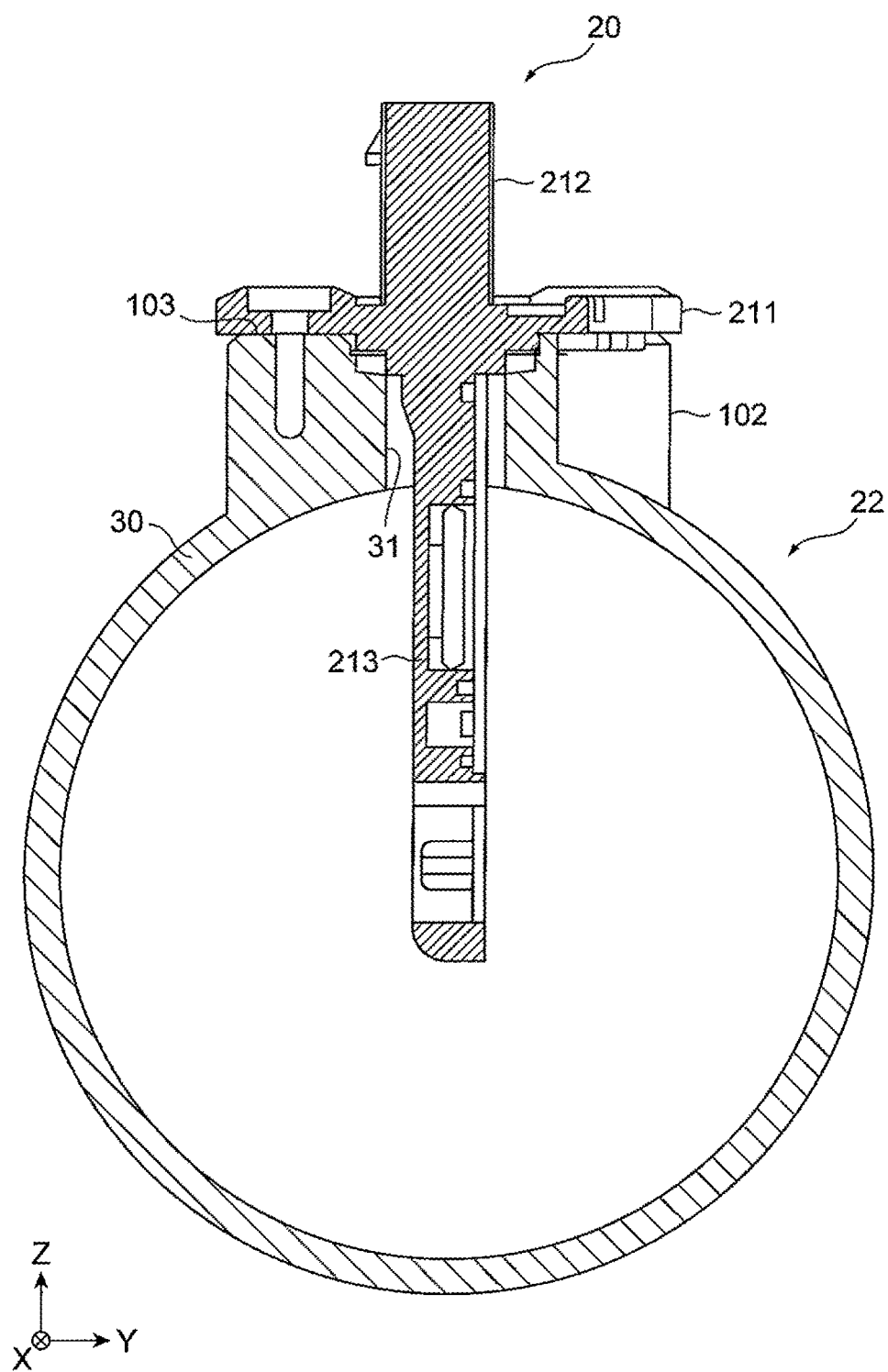
FIG. 5B is a cross-sectional view along line VB-VB of FIG. 5A.

FIG. 4A is an exterior perspective view of a physical-quantity detection unit, FIG. 4B is an exploded perspective view of the physical-quantity detection unit illustrated in FIG. 4A, FIG. 5A is a front view of the physical-quantity detection unit, and FIG. 5B is a cross-sectional view along line VB-VB of FIG. 5A.

The physical-quantity detection unit includes the physical-quantity detection device 20 and the main passage 22. The physical-quantity detection device 20 is mounted on the main passage 22 in a state where the measurement section 213 of the physical-quantity detection device 20 is inserted into the main passage 22 from the mounting hole 31 provided in the main passage 22.

Figure 6B:
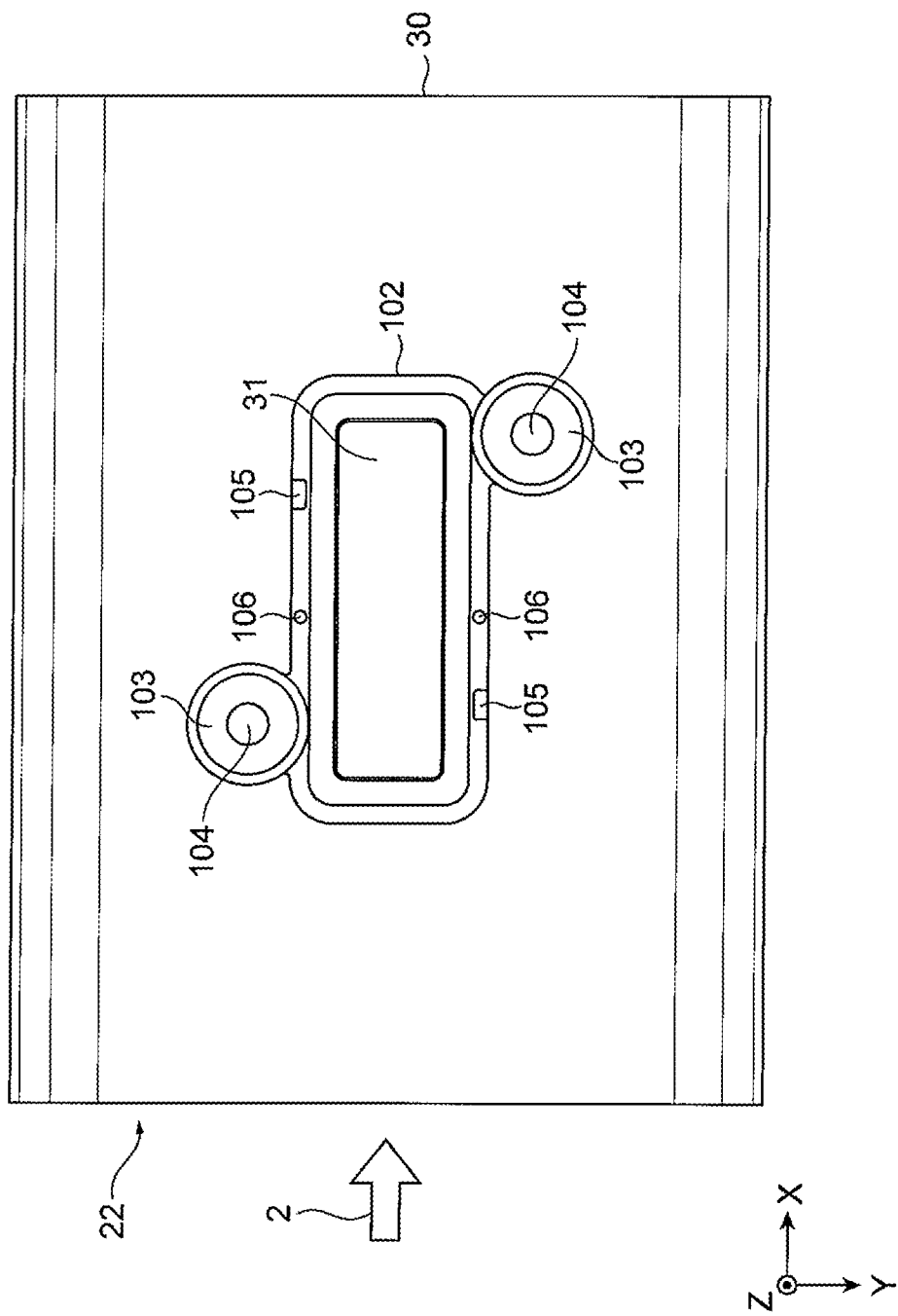
FIG. 6B is a plan view of the main passage.

FIG. 6A is a front view of the main passage, and FIG. 6B is a plan view of the main passage. Incidentally, in the following description, a central axis of the cylindrical body 30 may be referred to as an X-axis, an axis in a radial direction of the cylindrical body 30, the axis passing through the mounting hole 31 to be orthogonal to the X-axis, may be referred as a Z-axis, and an axis in the radial direction of the cylindrical body 30, the axis being orthogonal to the X-axis and the Y-axis, may be referred to as a Y-axis.

The main passage 22 is formed of the cylindrical body 30 made of, for example, synthetic resin. The mounting hole 31 is open in a cylindrical wall of the cylindrical body 30. The mounting hole 31 has a substantially rectangular shape in a plan view, which has long sides in a direction along the X-axis of the cylindrical body 30 and short sides in a direction along the Y-axis of the cylindrical body 30. The mounting pedestal 102 to which the flange 211 of the physical-quantity detection device 20 is fixed is provided around the mounting hole 31.

The mounting pedestal 102 is integrally formed with the cylindrical body 30, and the seat surface 103 facing the lower surface of the flange 211 of the physical-quantity detection device 20 is provided at a distal end in a Z-axis direction of the mounting pedestal 102. A pair of the screw holes 104 into which the fixing screws (unillustrated) are to be screwed and a pair of protruding portions 105 to be inserted into the recessed grooves 90 of the lower surface of the flange 211 are provided in the seat surface 103 of the mounting pedestal 102.

Figure 7:
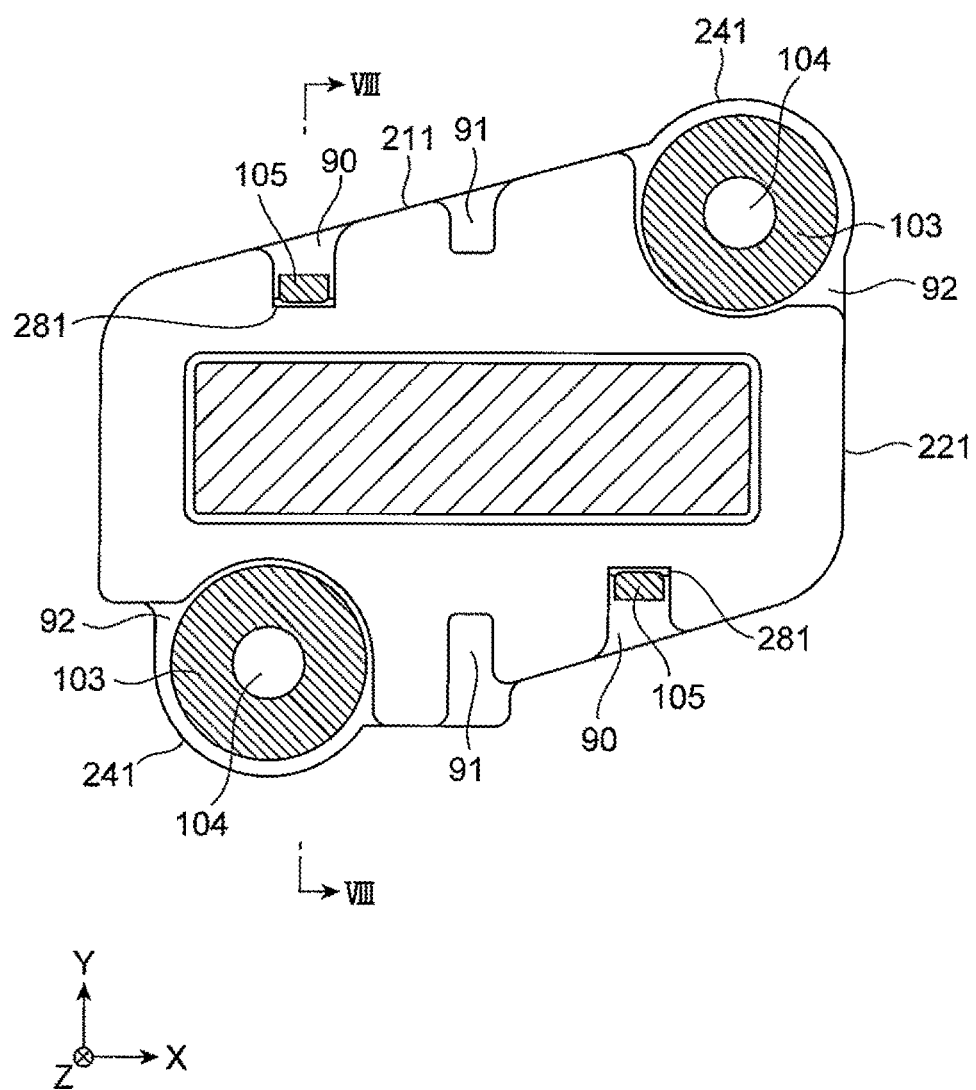
FIG. 7 is a cross-sectional view along line VII-VII of FIG. 5A.

The pair of screw holes 104 are formed at positions that are separated from each other in a Y-axis direction of the cylindrical body 30 with the mounting hole 31 interposed therebetween, and at positions that are separated from each other in an X-axis direction of the cylindrical body 30. Then, the pair of protruding portions 105 are formed at positions that are separated from each other in the Y-axis direction from a straight line which connects the pair of screw holes 104 with the mounting hole 31 interposed therebetween. In the present embodiment, the protruding portion 105 is formed at a position that faces the screw hole 104 with the mounting hole 31 interposed therebetween. As illustrated in FIG. 7, the protruding portion 105 has long wall surface along the X-axis direction and short wall surfaces along the Y-axis direction. In addition, a pair of protruding portions 106 are further provided on the seat surface 103 of the mounting pedestal 102. The protruding portion 106 is provided at an intermediate position between the screw hole 104 and the protruding portion 105.

The mounting pedestal 102 and the protruding portions 105 are in surface contact with the recessed grooves 90 and the recessed grooves 92, which are disposed in the flange 211, in a longitudinal direction to secure a plurality of fixing points, so that the resonance point of the physical-quantity detection device 20 can be improved and the vibration resistance performance can be improved.

In addition, the protruding portion 106 is auxiliarly used for positioning when the physical-quantity detection device 20 is mounted, and is disposed to not be in surface contact with the recessed groove 91, which is disposed in the flange 211, in the longitudinal direction, but to be in contact with side walls of the recessed groove 91 within the range of the tolerance of the through-hole 242 and a variation in mounting position. Accordingly, when the physical-quantity detection device 20 is mounted on the seat surface 103, the variation can be reduced. However, since the protruding portions 106 are not components essential for installation, the protruding portions 106 are omitted from the drawings from FIG. 7 and onward.

FIG. 7 is a cross-sectional view along line VII-VII of FIG. 5A, and FIG. 8 is a cross-sectional view along line VIII-VIII of FIG. 7 and illustrates a positional relationship between the flange 211 and the seat surface 103.

The recessed groove 90, the recessed groove 91, and the recessed groove 92 are provided in the lower surface of the flange 211.

The recessed groove 90, the recessed groove 91, and the recessed groove 92 are disposed at positions corresponding to the protruding portion 105, the protruding portion 106, and the fixing portion 241 of the mounting pedestal 102.

The recessed groove 90 has a groove shape that is open in a side surface of the flange 211. The recessed groove 90 has a pair of groove side wall surfaces that are separated from each other in the lateral direction of the measurement section 213 to face each other, and a groove bottom wall surface that extends between the pair of groove side wall surfaces along the lateral direction of the measurement section 213. When the physical-quantity detection device 20 is mounted on the main passage 22, the protruding portion 105 is inserted into the recessed groove 90 from the lower surface toward the upper surface of the flange 211 to be held in a state where the groove side wall surfaces and the groove bottom wall surface face the short wall surfaces and the long wall surface of the protruding portion 105.

A press-fitting portion 281 into which the protruding portion 105 is press-fitted is provided in the groove bottom wall surface of the recessed groove 90. The press-fitting portion 281 protrudes from the groove bottom wall surface of the recessed groove 90. Until the measurement section 213 is inserted into the mounting hole 31 and the lower surface of the flange 211 comes into contact with the seat surface 103, the housing 201 is pushed to the mounting pedestal 102 of the main passage 22 (insertion direction illustrated in FIGS. 9A and 9B), so that the protruding portion 105 is inserted into the recessed groove 90. The press-fitting portion 281 comes into contact with the long wall surface of the protruding portion 105 inserted into the recessed groove 90, to be plastically deformed in a crushing direction, so that the protruding portion 105 is press-fitted and the protruding portion 105 is fixed. The press-fitting portion 281 has a crush rib structure where when the physical-quantity detection device 20 is mounted on the main passage 22, the press-fitting portion 281 comes into contact with the protruding portion 105 to be crushed. Since it is assumed that the press-fitting portion 281 is press-fitted to the end to be crushed, the press-fitting portion 281 is used in a plastically deformed state, and the degree of press-fitting can also be light press-fitting.

Due to the above-described fixing effect, when the physical-quantity detection device 20 is mounted on the main passage 22, the physical-quantity detection device 20 can be fastened to the mounting pedestal 102, and a variation in mounting position can be greatly reduced. In such a manner, since the variation in mounting position of the physical-quantity detection device 20 can be reduced, as a result, the flow rate detection accuracy can be improved.

In addition, as points where the physical-quantity detection device 20 is in surface contact with the main passage 22, in addition to surface contact between the groove side wall surfaces of the recessed groove 90 and the short wall surfaces of the protruding portion 105 and surface contact between the seat surface 103 and the fixing portion 241, the press-fitting portion 281 and the long wall surface of the protruding portion 105 can be in surface contact with each other. For this reason, the number of fixing points are further secured, so that the resonance point of the physical-quantity detection device 20 can be improved and the vibration resistance performance can be improved.

Figure 9A:
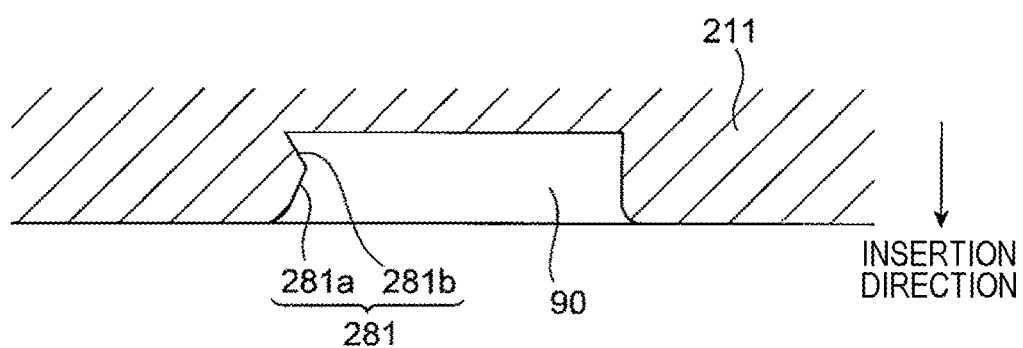
FIG. 9A is an enlarged view of an IX portion of FIG. 8, which describes one example of a press-fitting portion.
Figure 9B:
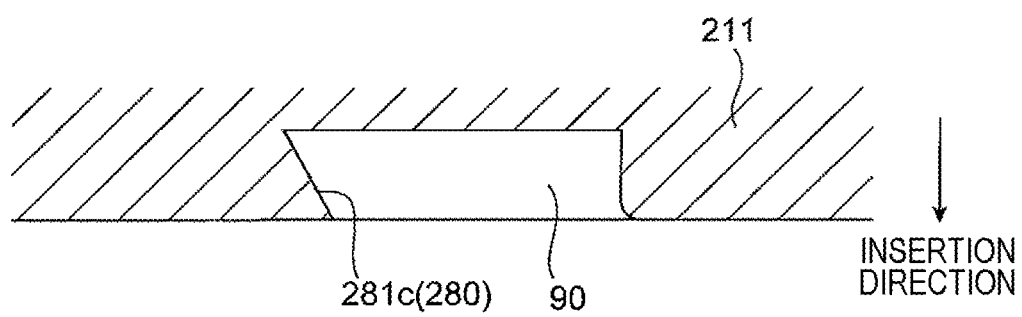
FIG. 9B is an enlarged view of the IX portion of FIG. 8, which describes one example of the press-fitting portion.

FIGS. 9A and 9B are enlarged views of an IX portion of FIG. 8, which describes one example of the press-fitting portion.

The press-fitting portion 281 has a burr shape where an undercut is made in the insertion direction in which the physical-quantity detection device 20 is mounted on the main passage 22. In the example illustrated in FIG. 9A, the press-fitting portion 281 has a first inclined surface 281a that gradually protrudes from the groove bottom wall surface of the recessed groove 90 as the first inclined surface 281a approaches the upper surface from the lower surface of the flange 211, and a second inclined surface 281b that gradually retracts toward the groove bottom wall surface of the recessed groove 90 as the second inclined surface 281b further approaches the upper surface of the flange 211 from the top of the first inclined surface 281a. Then, when the protruding portion 105 is inserted, a top point between the first inclined surface 281a and the second inclined surface 281b is plastically deformed in a crushing direction, so that the protruding portion 105 is press-fitted.

In addition, in the example illustrated in FIG. 9B, an undercut surface 281c that gradually retracts as the undercut surface 281c approaches the upper surface from the lower surface of the flange 211 is provided. Then, when the protruding portion 105 is inserted, a top point of the undercut surface 281c is plastically deformed in a crushing direction, so that the protruding portion 105 is press-fitted. Accordingly, the protruding portion 105 can be efficiently crushed during press-fitting, and it can be made difficult for the protruding portion 105 to come off.

For example, GF 30 is used as the resin material of the main passage 22, and GF 40 is used as the resin material of the flange 211 of the physical-quantity detection device 20. In such a manner, even when there is a difference in resin strength between the physical-quantity detection device 20 and the main passage 22, since the press-fitting portion 281 adopts a shape design where a portion that is weaker in shape than the recessed groove 90 is used, regardless of a combination of resin materials, the press-fitting portion 281 can be press-fitted and fixed to the protruding portion 105.

In addition, the protruding portion 105 is integrally molded in a detachment direction of a mold, and does not require a complicated mold structure such as a slide piece. In the present embodiment, the mold of a portion forming the flange 211 slides in a width direction (X-axis direction) of the measurement section 213 to be opened and closed. Therefore, the recessed groove 90 including the press-fitting portion 281 having an undercut shape can be molded with the mold without using a slide piece or the like. Accordingly, the cost of the mold can be reduced. In addition, an insert piece may be used in consideration of abrasion or maintainability.

Figure 10A:
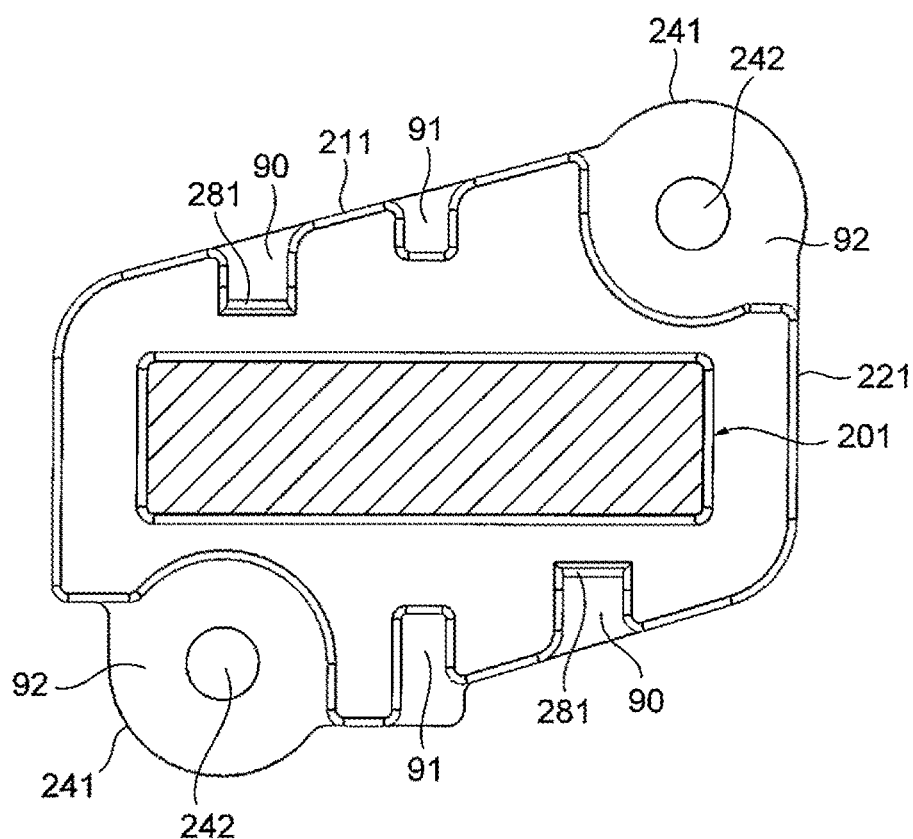
FIG. 10A is a cross-sectional view along line X-X of FIG. 2D.

FIG. 10A is a cross-sectional view along line X-X of FIG. 2D, and FIGS. 10B to 10D are views describing other embodiments corresponding to FIG. 10A.

As illustrated in FIG. 10A, it is preferable that the press-fitting portions 281 be disposed separate from each other in a direction intersecting a straight line that connects the through-holes 242 of the flange 211. Accordingly, when the flange 211 having a diamond shape is mounted on the mounting pedestal 102, the physical-quantity detection device 20 is prevented from rotating along a plane including the X-axis and the Y-axis of the main passage 22, a rotational variation can be efficiently constrained.

In the present embodiment, the flange 211 having a diamond shape is illustrated as one example; however, the shape of the flange 211 may be a square shape, a rectangular shape, a circular shape, or an elliptical shape. For example, when the flange 211 has a circular shape, the positional misalignment in a rotational direction of the physical-quantity detection device 20 with respect to the main passage 22 can be constrained by providing only one press-fitting portion 281. For this reason, the fixing effect can be obtained regardless of the shape of the flange 211.

Figure 10B:
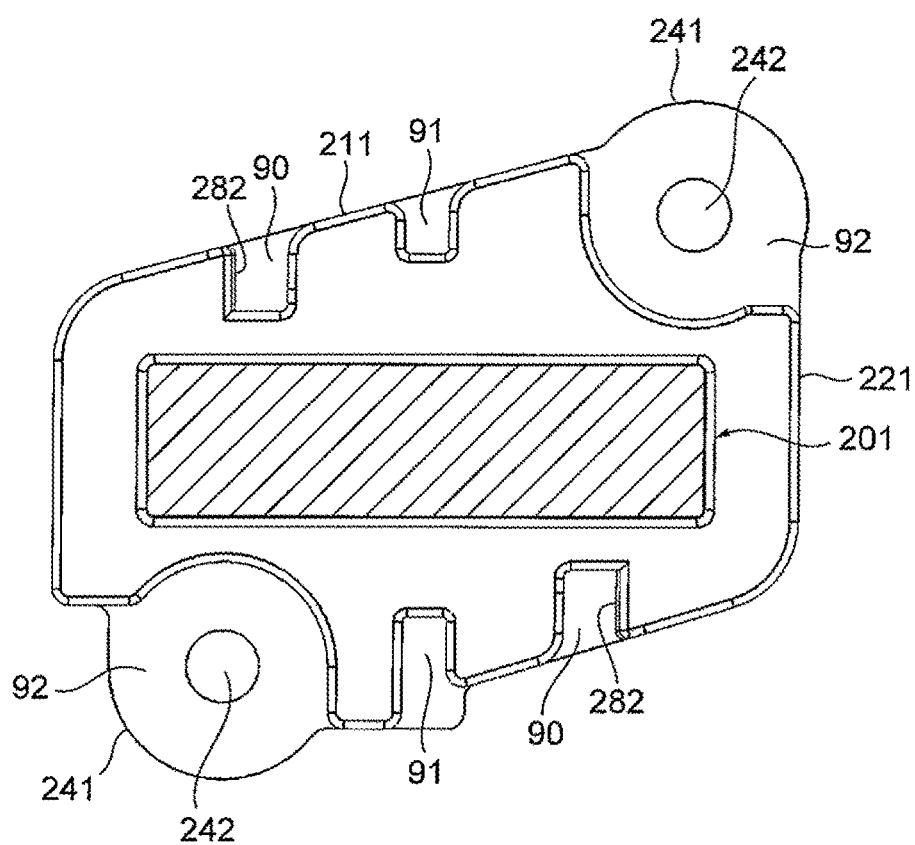
FIG. 10B is a view describing another embodiment corresponding to a cross section along line X-X of FIG. 2D.
Figure 10C:
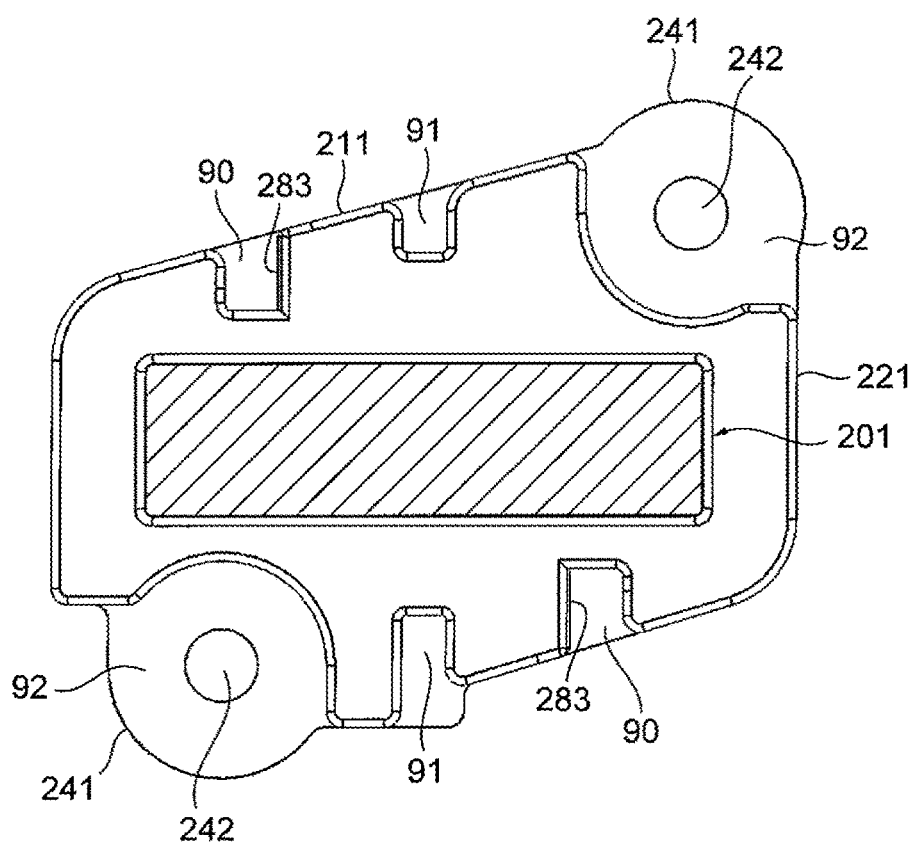
FIG. 10C is a view describing another embodiment corresponding to the cross section along line X-X of FIG. 2D.
Figure 10D:
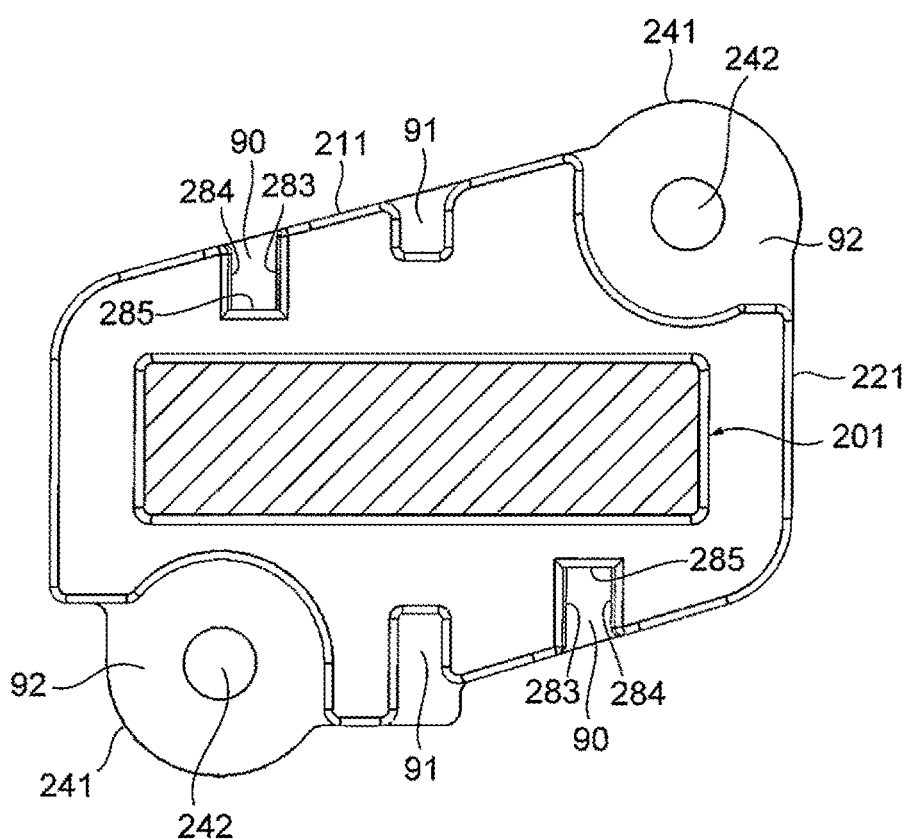
FIG. 10D is a view describing another embodiment corresponding to the cross section along line X-X of FIG. 2D.

In addition, in the present embodiment, as illustrated in FIG. 10A, the press-fitting portion 281 is disposed in the groove bottom wall surface of the recessed groove 90; however, the present invention is not limited to the configuration. For example, as illustrated in FIG. 10B or 10C, press-fitting portions 282 and 283 may be provided in one groove side wall surface of the pair of groove side wall surfaces of the recessed groove 90 instead of in the groove bottom surface of the recessed groove 90. Then, although not particularly illustrated, press-fitting portions may be provided in both of the pair of groove side wall surfaces of the recessed groove 90 instead of in the groove bottom surface of the recessed groove 90. In addition, as illustrated in FIG. 10D, a press-fitting portion 285 may be provided in the groove bottom surface of the recessed groove 90, and press-fitting portions 283 and 284 may be provided in both of the pair of groove side wall surfaces of the recessed groove 90.

When it is assumed that screws are screwed clockwise into the screw holes 104 of the mounting pedestal 102 in order to fix the flange 211 to the mounting pedestal 102, the physical-quantity detection device 20 may be biased similarly in a direction to rotate clockwise with respect to the main passage 22 due to screwing torque, to be mounted on the main passage 22. In that case, as illustrated in FIG. 10B, the press-fitting portion 282 is disposed in a direction opposite the rotational direction where the screws are fastened, and thus a variation in mounting position in the rotational direction can be efficiently reduced.

In addition, in the present embodiment, the press-fitting portion is disposed in the groove bottom wall surface or the groove side wall surface of the recessed groove 90; however, for example, in addition to the recessed groove 90 or instead of the recessed groove 90, the press-fitting portion may be installed in a groove side wall surface of the recessed groove 91 or a groove side wall surface of the recessed groove 92, and similar to the case of the recessed groove 90, the effect of reducing the variation when the physical-quantity detection device 20 is mounted on the main passage 22 is obtained. For this reason, the installation position of the press-fitting portion may be disposed in the flange 211, and the number of installations may be one or more.

For example, during production of the physical-quantity detection device 20, when a second press-fitting portion is disposed in the groove bottom wall surface or the groove side wall surface of the recessed groove 91 and positioning is performed, the variation in mounting position can be further reduced in output characteristics, and a more accurate flow rate adjustment can be performed. In addition, when the fitting tolerance of the second press-fitting portion provided in the recessed groove 91 is smaller than the tolerance of a first press-fitting portion provided in the recessed groove 90, an improvement in production variation during production of the physical-quantity detection device 20 and the ease of mounting to the main passage 22 on a vehicle side can be obtained.

Figure 11:
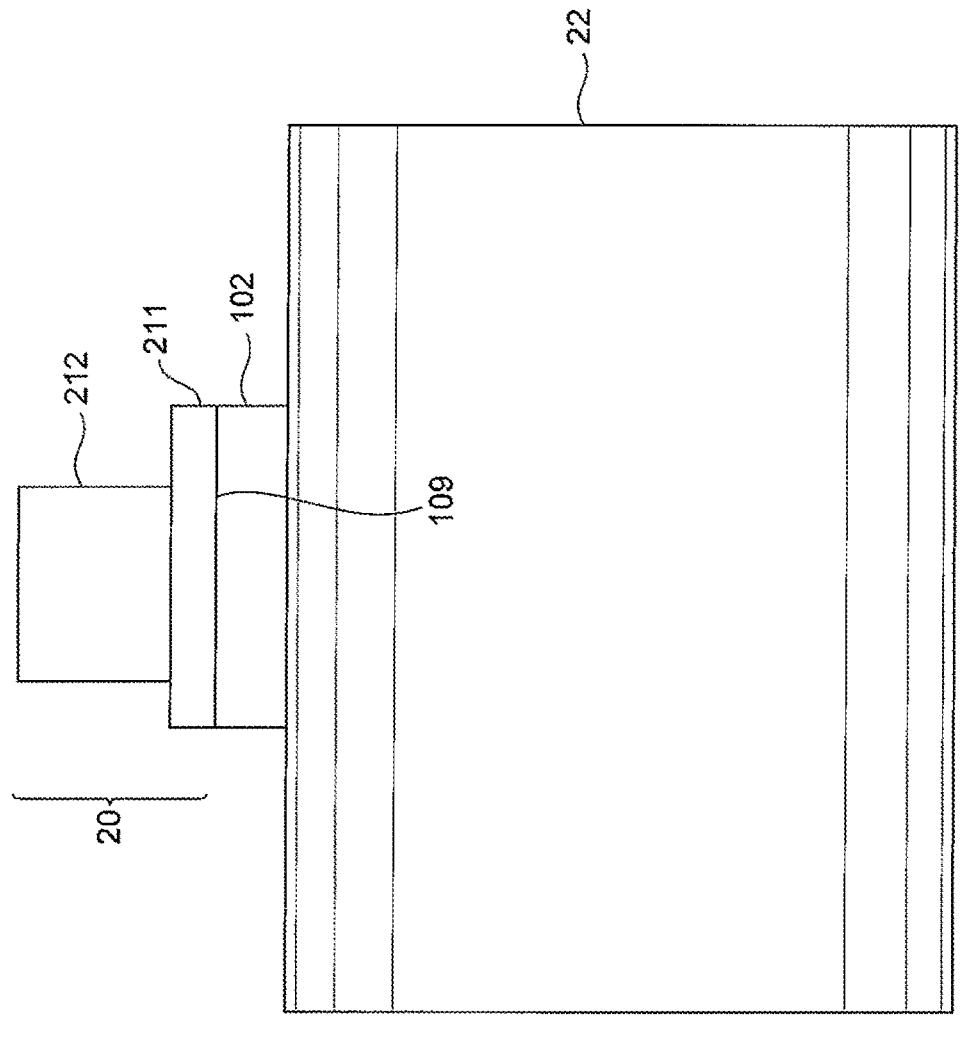
FIG. 11 is a view describing another embodiment corresponding to FIG. 5A.

FIG. 11 is a view describing another embodiment corresponding to FIG. 5A, and FIG. 12 is a view describing another embodiment corresponding to FIG. 5A and illustrates a case where the physical-quantity detection device 20 is not screw fixed to the main passage 22.

For example, the embodiment illustrated in FIG. 11 illustrates a case where the flange 211 and the mounting pedestal 102 are joined by a welding 109. Even when the welding 109 is used, when the physical-quantity detection device 20 is positioned in the main passage 22, there is a variation in mounting position. For this reason, the flange 211 may be fixed to the mounting pedestal 102 by the welding 109 in a state where the flange 211 is positioned and fixed to the seat surface 103 of the mounting pedestal 102 by the press-fitting portion. Incidentally, the welding 109 may be a vibration welding, a laser welding, or the like by which resins are melted and joined.

For example, the embodiment illustrated in FIG. 12 illustrates a case where the flange 211 and the mounting pedestal 102 are fixed by a snap fit 110. Even when the snap fit 110 is used, when the physical-quantity detection device 20 is positioned in the main passage 22, there is a variation in mounting position. For this reason, the flange 211 may be fixed to the mounting pedestal 102 by the snap fit 110 in a state where the flange 211 is positioned and fixed to the seat surface 103 of the mounting pedestal 102 by the press-fitting portion.

Incidentally, in a method for fixing the physical-quantity detection device 20 to the main passage 22, screwing may be performed at one point, and the welding 109 and the snap fit 110, other press-fitting pins, and the like which are other fixing means may be combined. According to the present embodiment, various fixing methods may be combined as long as the physical-quantity detection device 20 can be fixed to the main passage 22 after the flange 211 of the physical-quantity detection device 20 is positioned on the seat surface 103 of the mounting pedestal 102 by the press-fitting portion.

<Structure of Connector>

As illustrated in FIG. 2E, four external terminals 247 and a correction terminal 248 are provided inside the connector 212. The external terminals 247 are terminals that output physical quantities such as a flow rate and temperature that are measurement results of the physical-quantity detection device 20, and power supply terminals that supply DC power to operate the physical-quantity detection device 20. The correction terminal 248 is a terminal that is used to perform measurement on the physical-quantity detection device 20 produced to obtain a correction value related to the physical-quantity detection device 20, and to store the correction value in a memory inside the physical-quantity detection device 20, and in a measurement operation thereafter of the physical-quantity detection device 20, correction data indicating the correction value stored in the above memory is used, and the correction terminal 248 is not used. Therefore, the correction terminal 248 has a different shape from that of the external terminal 247 such that when the external terminals 247 are connected to another external device, the correction terminal 248 does not become interference. In the embodiment, the correction terminal 248 is shaped shorter than the external terminal 247, and even when connection terminals of the external device, which are connected to the external terminals 247, are inserted into the connector 212, the correction terminal 248 does not become an obstacle to connection.

<Structure of Housing>

Figure 3A:
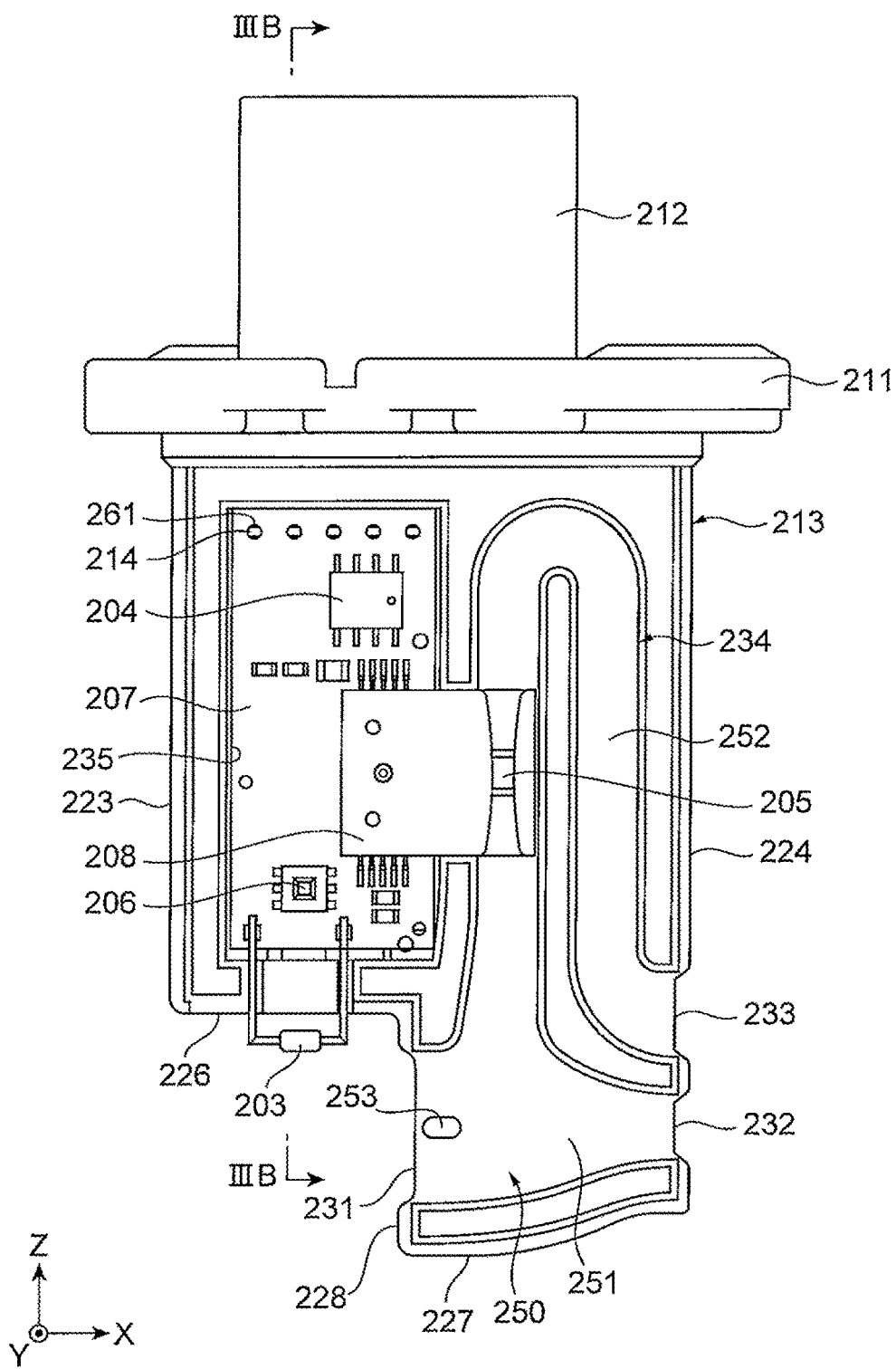
FIG. 3A is a front view illustrating a state where a cover of the physical-quantity detection device is removed.
Figure 3B:
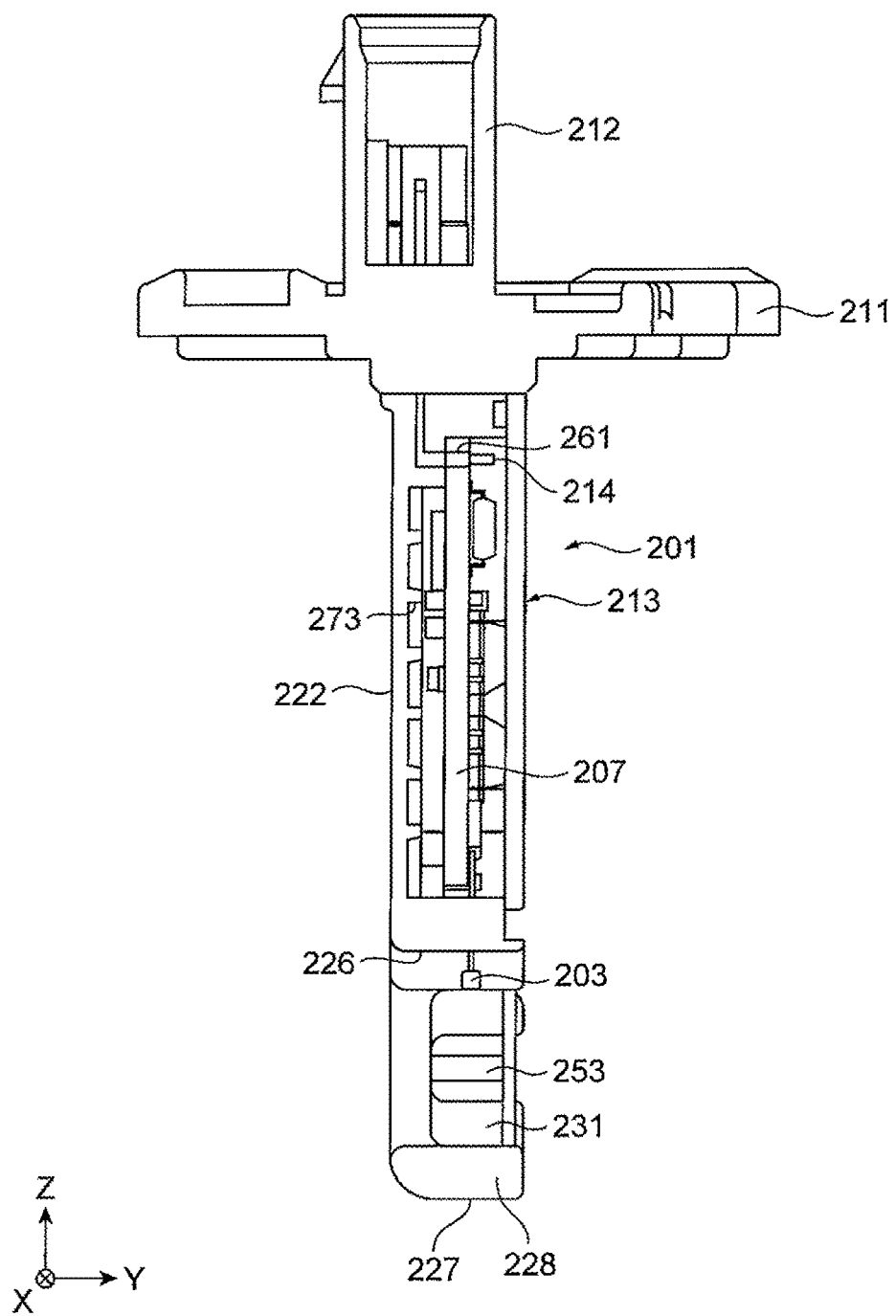
FIG. 3B is a cross-sectional view along line IIIB-IIIB of FIG. 3A.

FIG. 3A is a front view of the housing in a state where the cover is removed, and FIG. 3B is a cross-sectional view along line IIIB-IIIB of FIG. 3A. Incidentally, in FIGS. 3A and 3B, a hot melt that seals the circuit substrate 207 is omitted.

The housing 201 is provided with an auxiliary passage groove 250 that forms an auxiliary passage 234 inside the measurement section 213, and a circuit chamber 235 that accommodates the circuit substrate 207. The circuit chamber 235 and the auxiliary passage groove 250 are recessed in the front surface of the measurement section 213, and are separately disposed on the one side and the other side in the lateral direction of the measurement section 213. The circuit chamber 235 is disposed at an upstream position in the flow direction of the gas 2 to be measured in the main passage 22, and the auxiliary passage 234 is disposed at a position downstream of the circuit chamber 235 in the flow direction of the gas 2 to be measured in the main passage 22.

A chip package 208 including the flow sensor that measures the flow rate of the gas 2 to be measured flowing through the main passage 22 is accommodated in the housing 201 in a state where the chip package 208 is mounted on the circuit substrate 207. The chip package 208 is fixed to a substrate surface of the circuit substrate 207 in a state where a part of the chip package 208 protrudes sideways from an end portion of the circuit substrate 207. The chip package 208 is disposed across from the auxiliary passage 234 to the circuit chamber 235.

The auxiliary passage groove 250 forms the auxiliary passage 234 in corporation with the cover 202. The auxiliary passage 234 extends along a protruding direction (longitudinal direction) of the measurement section. The auxiliary passage groove 250 forming the auxiliary passage 234 has a first auxiliary passage groove 251 and a second auxiliary passage groove 252 that branches in the middle of the first auxiliary passage groove 251. The first auxiliary passage groove 251 is formed along the lateral direction of the measurement section 213 so as to extend across from the inlet 231 that is open in the step surface 228 of the measurement section 213 to the first outlet 232 that is open in the side surface on the other side of the measurement section 213 at the position opposite the step surface 228. The inlet 231 is disposed to face the upstream side in the flow direction of the gas 2 to be measured in the main passage 22. The first auxiliary passage groove 251 forms a first auxiliary passage that takes in the gas 2 to be measured, which flows through the main passage 22, from the inlet 231 to allow the gas 2 to be measured, which has been taken in, to return from the first outlet 232 to the main passage 22. The first auxiliary passage extends from the inlet 231 along the flow direction of the gas 2 to be measured in the main passage 22 to be connected to the first outlet 232.

The second auxiliary passage groove 252 branches at a position in the middle of the first auxiliary passage groove 251 to extend toward a proximal end portion side (flange side) of the measurement section 213 along the longitudinal direction of the measurement section 213. Then, the second auxiliary passage groove 252 is bent in a proximal end portion of the measurement section 213 toward the other side in the lateral direction of the measurement section 213 to make a U-turn and then extend again toward the distal end portion of the measurement section 213 along the longitudinal direction of the measurement section 213. Then, the second auxiliary passage groove 252 is bent in front of the first outlet 232 toward the other side in the lateral direction of the measurement section 213 to continue to the second outlet 233 which is open in the side surface 224 on the other side of the measurement section 213. The second outlet 233 is disposed to face the downstream side in the flow direction of the gas 2 to be measured in the main passage 22. The second outlet 233 has substantially the same or a slightly larger opening area than the first outlet 232, and is formed at a position closer to the proximal end portion side in the longitudinal direction of the measurement section 213 than the first outlet 232.

The second auxiliary passage groove 252 forms a second auxiliary passage that allows the gas 2 to be measured, which has branched from the first auxiliary passage to flow in, to pass therethrough and then to return to the main passage 22 from the second outlet 233. The second auxiliary passage has a round trip route along the longitudinal direction of the measurement section 213. Namely, the second auxiliary passage has a route that branches in the middle of the first auxiliary passage to extend toward the proximal end portion side of the measurement section 213, to turn around on the proximal end portion side of the measurement section 213 to extend toward the distal end portion side of the measurement section 213, and then to be connected to the second outlet 233 which is disposed downstream of the inlet 231 in the flow direction of the gas 2 to be measured in the main passage 22 to face the downstream side in the flow direction of the gas 2 to be measured. The flow sensor 205 is disposed at a position in the middle of the second auxiliary passage groove 252. According to the second auxiliary passage groove 252, a longer passage length can be secured in the second auxiliary passage, and when a pulsation occurs in the main passage, the influence of the pulsation on the flow sensor 205 can be reduced.

According to the above configuration, the auxiliary passage 234 can be formed along an extending direction of the measurement section 213, and a sufficiently long length can be secured in the auxiliary passage 234. Accordingly, the physical-quantity detection device 20 can have the auxiliary passage 234 having a sufficient length. Therefore, the physical-quantity detection device 20 can suppress the fluid resistance to a small value, and measure the physical quantities of the gas 2 to be measured with high accuracy.

Since the first auxiliary passage groove 251 extends from the inlet 231 to the first outlet 232 along the lateral direction of the measurement section 213, the first auxiliary passage groove 251 enables foreign matter such as dust, which has infiltrated into the first auxiliary passage from the inlet 231, to exit from the first outlet 232 as it is, and can prevent foreign matter from infiltrating into the second auxiliary passage to prevent the foreign matter from affecting the flow sensor 205 in the second auxiliary passage.

In the inlet 231 and the first outlet 232 of the first auxiliary passage groove 251, the inlet 231 has a larger opening area than the first outlet 232. Since the opening area of the inlet 231 is larger than that of the first outlet 232, the gas 2 to be measured which has flown into the first auxiliary passage can be reliably guided also to the second auxiliary passage that branches in the middle of the first auxiliary passage.

A protruding portion 253 is provided in the inlet 231 of the first auxiliary passage groove 251 at a central position in the longitudinal direction. The protruding portion 253 equally divides the size of the inlet 231 into two parts in the longitudinal direction such that the opening area of each of the divided parts is smaller than those of the first outlet 232 and the second outlet 233. The protruding portion 253 limits the size of foreign matter, which can infiltrate into the first auxiliary passage from the inlet 231, to a size smaller than those of the first outlet 232 and the second outlet 233, to be able to prevent foreign matter from blocking the first outlet 232 or the second outlet 233.

<Position of Disposition of Each Sensor>

As illustrated in FIG. 3A, the circuit chamber 235 is provided on the one side in the lateral direction of the measurement section 213, and accommodates the circuit substrate 207. The circuit substrate 207 has a rectangular shape extending along the longitudinal direction of the measurement section, and the chip package 208, a pressure sensor 204, and a temperature and humidity sensor 206 are mounted on a surface of the circuit substrate 207.

The chip package 208 is mounted on the circuit substrate 207. The flow sensor 205 and an LSI that is an electronic component driving the flow sensor 205 are mounted on the chip package 208. In a state where a part of the chip package 208 protrudes from the circuit substrate 207 to the other side in the lateral direction at a central position in a longitudinal direction of the circuit substrate 207, the chip package 208 is mounted such that the flow sensor 205 is disposed in the second auxiliary passage groove 252.

The pressure sensor 204 is mounted closer to a proximal end portion side in the longitudinal direction of the circuit substrate 207 than the chip package 208, and the temperature and humidity sensor 206 is mounted closer to a distal end side in the longitudinal direction of the circuit substrate 207 than the chip package 208. Then, the lead of the intake air temperature sensor 203 is connected to the surface of the circuit substrate 207. The intake air temperature sensor 203 is mounted such that the lead 203b is connected at a position closer to the distal end side in the longitudinal direction of the circuit substrate 207 than the temperature and humidity sensor 206 and the sensor main body 203a protrudes from the circuit substrate 207 in the longitudinal direction to be disposed at a position exposed outside the measurement section 213.

In the measurement section 213, (1) the pressure sensor 204, (2) the flow sensor 205, (3) the temperature and humidity sensor 206, and (4) the intake air temperature sensor 203 are disposed in order from the proximal end portion side toward the distal end portion side along the longitudinal direction of the measurement section 213 (toward the protruding direction of the measurement section 213). The pressure sensor 204 detects the pressure of the gas 2 to be measured, and the flow sensor 205 detects the flow rate of the gas 2 to be measured. The temperature and humidity sensor 206 detects the humidity of the gas 2 to be measured, and the intake air temperature sensor 203 detects the temperature of the gas to be measured.

According to the present embodiment, since the circuit substrate 207 is disposed to extend along the longitudinal direction of the measurement section 213, the heat conduction distance from the flange 211 can be secured up to the vicinity of the central axis of the main passage 22. Then, since the sensors (1) to (4) are disposed side by side from the proximal end portion toward the distal end portion of the measurement section 213 in order where the sensors are less prone to being thermally affected, the sensor performance of each sensor can be ensured. In addition, since the circuit substrate 207 is disposed on the one side in the lateral direction of the measurement section 213, the conductivity of heat to air can be promoted.

<Structure of Cover>

The cover 202 is made of an electrically conductive material formed of metal such as an aluminum alloy or a stainless alloy. The cover 202 has a flat plate shape that covers the front surface of the measurement section 213, and is fixed to the measurement section 213 by an adhesive. The cover 202 covers the circuit chamber 235 of the measurement section 213, and forms the auxiliary passage 234 in corporation with the auxiliary passage groove 250 of the measurement section 213. An electrically conductive intermediate member is interposed between the cover 202 and a predetermined connector terminal 214, so that the cover 202 is electrically connected to the ground and has a static elimination function.

The embodiments of the present invention have been described above; however, the present invention is not limited to the above embodiments, and various design changes can be made without departing from the concept of the present invention described in the claims. For example, the above embodiments have described in detail to facilitate the understanding of the present invention, and the present invention is not necessarily limited to those including all of the configurations described. In addition, a part of a configuration of an embodiment can be substituted with a configuration of another embodiment, and a configuration of another embodiment can be added to a configuration of an embodiment. Furthermore, the addition, removal, and substitution of another configuration can be made to a part of the configuration of each embodiment.

REFERENCE SIGNS LIST 1 internal combustion engine control system
2 gas to be measured
20 physical-quantity detection device
22 main passage
90 recessed groove
91 recessed groove
92 recessed groove
100 bush
102 mounting pedestal
103 seat surface
104 screw hole
105 protruding portion
106 protruding portion
107 side wall
108 side wall
109 welding
110 snap fit
201 housing
202 cover
203 intake air temperature sensor
204 pressure sensor
205 flow sensor
206 temperature and humidity sensor
207 circuit substrate
208 chip package
211 flange
212 connector
213 measurement section
214 connector terminal
215 rib (circuit chamber bottom surface)
221 front surface
222 back surface
223 side surface on one side
224 side surface on the other side
226 lower surface on one side
227 lower surface on the other side
228 step surface
231 inlet
232 first outlet
233 second outlet
234 auxiliary passage
235 circuit chamber
237 rib (circuit chamber bottom surface)

238 recessed groove for positioning
241 fixing portion
242 through-hole
243 first rib
244 second rib
245 third rib
246 fourth rib
247 external terminal
248 correction terminal
281 to 285 press-fitting portion

The invention claimed is:

1. A physical-quantity detection device comprising:
a flange fixed to a seat surface of a main passage; and
a measurement section that protrudes from the flange to be inserted into in the main passage from a mounting hole of the main passage and to be disposed,
wherein the flange is provided with a press-fitting portion into which a protruding portion protruding from the seat surface of the main passage is press-fitted.

2. The physical-quantity detection device according to claim 1, wherein
the flange is provided with a plurality of screw holes,
the flange is screwed and fixed to the seat surface with fixing screws, and
the press-fitting portions are disposed separate from each other in a direction intersecting a line that connects the plurality of screw holes to each other.

3. The physical-quantity detection device according to claim 2, wherein the press-fitting portion has a crush rib structure where the press-fitting portion comes into contact with the protruding portion to be crushed.

4. The physical-quantity detection device according to claim 2, wherein the press-fitting portion is formed in a side surface in a direction opposite rotation of the fixing screw among side surfaces of a groove formed in the flange.

5. The physical-quantity detection device according to claim 2, wherein the press-fitting portion is disposed to make contact in a direction opposite a rotational direction where the fixing screw is fastened.

6. The physical-quantity detection device according to claim 5, wherein a plurality of the press-fitting portions are provided.

7. The physical-quantity detection device according to claim 6, wherein the press-fitting portion has a burr shape with respect to an insertion direction of the measurement section.

8. The physical-quantity detection device according to claim 7, wherein the shape of the press-fitting portion is integrally molded in a detachment direction of a mold.

9. The physical-quantity detection device according to claim 6, wherein the press-fitting portion includes a second press-fitting portion that is used during production of a sensor.

10. The physical-quantity detection device according to claim 9, wherein a fitting tolerance of the second press-fitting portion is smaller than a fitting tolerance of the press-fitting portion.

11. The physical-quantity detection device according to claim 1, wherein the press-fitting portion is plastically deformed and fixed.

12. The physical-quantity detection device according to claim 1, wherein the flange is welded to the seat surface.

13. The physical-quantity detection device according to claim 1, wherein the flange is fixed to the seat surface by a snap fit.

* * * * *